(12) United States Patent
Friesen et al.

(10) Patent No.: US 9,178,207 B2
(45) Date of Patent: *Nov. 3, 2015

(54) ELECTROCHEMICAL CELL SYSTEM WITH A PROGRESSIVE OXYGEN EVOLVING ELECTRODE / FUEL ELECTRODE

(75) Inventors: Cody A. Friesen, Fort McDowell, AZ (US); Ramkumar Krishnan, Gilbert, AZ (US); Todd Trimble, Phoenix, AZ (US); Sergey Puzhaev, Scottsdale, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 818 days.

This patent is subject to a terminal disclaimer.

(21) Appl. No.: 13/230,549

(22) Filed: Sep. 12, 2011

(65) Prior Publication Data
US 2012/0068667 A1    Mar. 22, 2012

Related U.S. Application Data

(60) Provisional application No. 61/383,510, filed on Sep. 16, 2010.

(51) Int. Cl.
    *H02J 7/14* (2006.01)
    *H01M 2/40* (2006.01)
    (Continued)

(52) U.S. Cl.
    CPC .............. *H01M 2/40* (2013.01); *H01M 4/045* (2013.01); *H01M 4/667* (2013.01); *H01M 4/70* (2013.01); *H01M 10/48* (2013.01); *H01M 12/08* (2013.01); *H01M 2/18* (2013.01); *H01M 10/44* (2013.01); *H01M 2004/025* (2013.01)

(58) Field of Classification Search
    CPC ........................................................ Y02E 60/50
    USPC ................................................................ 320/122
    See application file for complete search history.

(56) References Cited

U.S. PATENT DOCUMENTS 2,083,364 A    6/1937    Cook, Jr.
3,219,486 A    11/1965   Gumucio
(Continued)

FOREIGN PATENT DOCUMENTS

CN    100037    1/2012
EP    0058090   8/1982
(Continued)

OTHER PUBLICATIONS

Intl. Preliminary Report on Patentability dated Feb. 27, 2013 of PCT/US2011/051213 filed Sep. 12, 2011 (6 pages).
(Continued)

*Primary Examiner* — Drew A Dunn
*Assistant Examiner* — Zixuan Zhou
(74) *Attorney, Agent, or Firm* — Pillsbury Winthrop Shaw Pittman, LLP

(57) ABSTRACT

One aspect of the present invention provides an electrochemical cell system comprising at least one electrochemical cell configured to be selectively connected to a load to discharge the cell by generating electrical current using a fuel and an oxidant. The electrochemical cell system may alternatively be connected to a power supply to recharge the cell. The electrochemical cell system comprises a plurality of electrodes and electrode bodies therein. The electrochemical cell system further comprises a switching system configured to permit progressive movement of the anodes used for charging each electrochemical cell, maintaining a minimum distance from a progressively moving cathode that is the site of fuel growth.

36 Claims, 13 Drawing Sheets

(51) Int. Cl.
*H01M 4/04* (2006.01)
*H01M 4/66* (2006.01)
*H01M 4/70* (2006.01)
*H01M 10/48* (2006.01)
*H01M 12/08* (2006.01)
*H01M 2/18* (2006.01)
*H01M 10/44* (2006.01)
*H01M 4/02* (2006.01)

(56) References Cited

U.S. PATENT DOCUMENTS

| | | |
|---|---|---|
| 3,223,611 A | 12/1965 | Wells |
| 3,338,746 A | 8/1967 | Plust |
| 3,483,036 A | 12/1969 | Gregor |
| 3,525,643 A | 8/1970 | Spahrbier |
| 3,532,548 A | 10/1970 | Stachurski |
| 3,615,843 A | 10/1971 | Moran |
| 3,615,844 A | 10/1971 | Spengler |
| 3,650,837 A | 3/1972 | Palmer |
| 3,713,892 A | 1/1973 | Moran |
| 3,716,413 A | 2/1973 | Eisner |
| 3,717,505 A | 2/1973 | Unkle, Jr. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley |
| 3,850,696 A | 11/1974 | Summers |
| 3,886,426 A | 5/1975 | Daggett |
| 3,919,062 A | 11/1975 | Lundquist, Jr. |
| 3,972,727 A | 8/1976 | Cohn |
| 4,119,772 A | 10/1978 | Peters |
| 4,201,653 A | 5/1980 | ONeill |
| 4,312,927 A | 1/1982 | Salmon |
| 4,317,863 A | 3/1982 | Struthers |
| 4,340,449 A | 7/1982 | Srinivasan |
| 4,385,101 A | 5/1983 | Catanzarite |
| 4,385,967 A | 5/1983 | Brady |
| 4,447,504 A | 5/1984 | Goebel |
| 4,461,817 A | 7/1984 | Itoh |
| 4,521,497 A | 6/1985 | Tamminen |
| 4,581,064 A | 4/1986 | Morrison |
| 4,684,585 A | 8/1987 | Tamminen |
| 4,693,946 A | 9/1987 | Niksa |
| 4,732,823 A | 3/1988 | Ito |
| 4,871,627 A | 10/1989 | Strong |
| 4,894,355 A | 1/1990 | Takeuchi |
| 5,009,755 A | 4/1991 | Shor |
| 5,104,497 A | 4/1992 | Tetzlaff |
| 5,185,218 A | 2/1993 | Brokman |
| 5,190,833 A | 3/1993 | Goldstein |
| 5,318,861 A | 6/1994 | Harats |
| 5,362,942 A * | 11/1994 | Vanderslice et al. .......... 219/209 |
| 5,376,471 A | 12/1994 | Hunter |
| 5,415,949 A | 5/1995 | Stone |
| 5,431,823 A | 7/1995 | Gofer |
| 5,434,020 A | 7/1995 | Cooper |
| 5,439,758 A | 8/1995 | Stone |
| 5,458,988 A | 10/1995 | Putt |
| 5,567,540 A | 10/1996 | Stone |
| 5,650,240 A | 7/1997 | Rogers |
| 5,652,068 A | 7/1997 | Shuster |
| 5,733,677 A | 3/1998 | Golovin |
| 5,850,136 A | 12/1998 | Kaneko |
| 5,935,724 A | 8/1999 | Spillman |
| 5,935,728 A | 8/1999 | Spillman |
| 5,938,899 A | 8/1999 | Forand |
| 5,972,531 A | 10/1999 | Kawakami |
| 5,998,967 A | 12/1999 | Umeki |
| 6,014,013 A | 1/2000 | Suppanz |
| 6,025,696 A | 2/2000 | Lenhart |
| 6,027,834 A | 2/2000 | Hayashi |
| 6,034,506 A | 3/2000 | Hall |
| 6,046,514 A | 4/2000 | Rouillard |
| 6,054,840 A | 4/2000 | Nakanishi |
| 6,057,052 A | 5/2000 | Shrim |
| 6,091,230 A | 7/2000 | Winzer |
| 6,121,752 A | 9/2000 | Kitahara |
| 6,127,061 A | 10/2000 | Shun |
| 6,153,328 A | 11/2000 | Colborn |
| 6,162,555 A | 12/2000 | Gutierrez |
| 6,165,638 A | 12/2000 | Spillman |
| 6,207,037 B1 | 3/2001 | Dartnell |
| 6,211,650 B1 | 4/2001 | Mumaw |
| 6,265,846 B1 | 7/2001 | Flechsig |
| 6,271,646 B1 | 8/2001 | Evers |
| 6,277,508 B1 | 8/2001 | Reiser |
| 6,312,846 B1 | 11/2001 | Marsh |
| 6,355,369 B1 | 3/2002 | Iarochenko |
| 6,379,828 B1 | 4/2002 | Worth |
| 6,383,673 B1 | 5/2002 | Faris |
| 6,383,675 B1 | 5/2002 | Zhong |
| 6,410,174 B1 | 6/2002 | Faris |
| 6,451,463 B1 * | 9/2002 | Tsai et al. .......... 429/9 |
| 6,458,480 B1 | 10/2002 | Morris |
| 6,465,638 B2 | 10/2002 | Gorman |
| 6,472,093 B2 | 10/2002 | Faris |
| 6,541,941 B2 | 4/2003 | Adams |
| 6,544,678 B2 | 4/2003 | Faris |
| 6,558,830 B2 | 5/2003 | Faris |
| 6,562,494 B1 | 5/2003 | Tsai |
| 6,562,504 B2 | 5/2003 | Faris |
| 6,566,000 B1 | 5/2003 | Iarochenko |
| 6,569,555 B1 | 5/2003 | Faris |
| 6,579,637 B1 | 6/2003 | Savage |
| 6,586,909 B1 | 7/2003 | Trepka |
| 6,641,943 B1 | 11/2003 | Faris |
| 6,646,418 B1 | 11/2003 | Xie |
| 6,649,294 B2 | 11/2003 | Faris |
| 6,653,252 B2 | 11/2003 | Kawahara |
| 6,673,490 B2 | 1/2004 | Miki |
| 6,677,077 B2 | 1/2004 | Spillman |
| 6,706,433 B2 | 3/2004 | Pinto |
| 6,713,206 B2 | 3/2004 | Markoski |
| 6,756,149 B2 | 6/2004 | Knights |
| 6,762,587 B1 | 7/2004 | Barbetta |
| 6,764,588 B2 | 7/2004 | Smedley |
| 6,787,260 B2 | 9/2004 | Smedley |
| 6,802,946 B2 | 10/2004 | Basol |
| 6,811,903 B2 | 11/2004 | Vartak |
| 6,822,423 B2 | 11/2004 | Yau |
| 6,838,203 B2 | 1/2005 | Zheng |
| 6,855,455 B1 | 2/2005 | Berger |
| 6,858,347 B2 | 2/2005 | Tanigawa |
| 6,866,950 B2 | 3/2005 | Connor |
| 6,902,602 B2 | 6/2005 | Keefer |
| 6,911,274 B1 | 6/2005 | Colborn |
| 6,942,105 B2 | 9/2005 | Smedley |
| 6,967,064 B2 | 11/2005 | Haltiner, Jr. |
| 6,986,964 B2 | 1/2006 | Faris |
| 7,020,355 B2 | 3/2006 | Lahann |
| 7,126,310 B1 | 10/2006 | Barron |
| 7,150,933 B1 | 12/2006 | McLean |
| 7,201,857 B2 | 4/2007 | Ovshinsky |
| 7,201,980 B2 * | 4/2007 | Sudo et al. .......... 429/449 |
| 7,226,676 B2 | 6/2007 | Faris |
| 7,238,440 B2 | 7/2007 | Damore |
| 7,252,898 B2 | 8/2007 | Markoski |
| 7,270,906 B2 | 9/2007 | Haltiner, Jr. |
| 7,273,541 B2 | 9/2007 | Choban |
| 7,276,309 B2 | 10/2007 | Smedley |
| 7,279,245 B1 | 10/2007 | Clark |
| 7,291,186 B2 | 11/2007 | Zhang |
| 7,303,835 B2 | 12/2007 | Mathias |
| 7,466,104 B2 | 12/2008 | Wang |
| 7,468,221 B2 | 12/2008 | Lafollette |
| 7,482,081 B2 | 1/2009 | Hong |
| 7,488,547 B1 | 2/2009 | Iacovelli |
| 7,535,199 B2 | 5/2009 | Kimura |
| 7,598,706 B2 | 10/2009 | Koski |
| 7,670,575 B2 | 3/2010 | Jarvinen |
| 7,670,705 B2 | 3/2010 | Ueda |
| 7,670,724 B1 | 3/2010 | Chan |

(56) References Cited

U.S. PATENT DOCUMENTS

| | | |
|---|---|---|
| 7,722,988 B2 | 5/2010 | Webber |
| 8,058,165 B2 | 11/2011 | Kawano |
| 8,163,410 B2 * | 4/2012 | Fulop et al. ............ 429/61 |
| 8,383,267 B2 * | 2/2013 | Konishiike et al. ....... 429/218.1 |
| 2001/0007725 A1 | 7/2001 | Faris |
| 2002/0015871 A1 | 2/2002 | Tao |
| 2002/0028372 A1 | 3/2002 | Ohlsen |
| 2002/0045075 A1 | 4/2002 | Pinto |
| 2002/0076602 A1 | 6/2002 | Finkelshtain |
| 2002/0098398 A1 | 7/2002 | Chen |
| 2002/0142203 A1 | 10/2002 | Ma |
| 2002/0146600 A1 * | 10/2002 | Vartak et al. ............. 429/9 |
| 2003/0054217 A1 | 3/2003 | Faris |
| 2003/0077501 A1 | 4/2003 | Knights |
| 2003/0099882 A1 | 5/2003 | Hampden-Smith |
| 2003/0134163 A1 | 7/2003 | Markoski |
| 2003/0143446 A1 | 7/2003 | Faris |
| 2003/0162068 A1 * | 8/2003 | Wilson et al. ............ 429/27 |
| 2003/0165727 A1 | 9/2003 | Priestnall |
| 2003/0175566 A1 * | 9/2003 | Fisher et al. ............. 429/22 |
| 2003/0190504 A1 | 10/2003 | Fisher |
| 2003/0198862 A1 | 10/2003 | Struthers |
| 2004/0005488 A1 | 1/2004 | Faris |
| 2004/0023112 A1 | 2/2004 | Lin |
| 2004/0053132 A1 | 3/2004 | Smedley |
| 2004/0058203 A1 | 3/2004 | Priestnall |
| 2004/0058217 A1 | 3/2004 | Ohlsen |
| 2004/0058226 A1 | 3/2004 | Lamarre |
| 2004/0121208 A1 | 6/2004 | James |
| 2004/0146764 A1 | 7/2004 | Tsai |
| 2004/0157092 A1 | 8/2004 | Kimberg |
| 2004/0157101 A1 | 8/2004 | Smedley |
| 2004/0175603 A1 | 9/2004 | Yang |
| 2004/0180246 A1 | 9/2004 | Smedley |
| 2004/0185323 A1 | 9/2004 | Fowler |
| 2004/0185328 A1 | 9/2004 | Lin |
| 2004/0225249 A1 | 11/2004 | Leonard |
| 2004/0229107 A1 | 11/2004 | Smedley |
| 2004/0247969 A1 | 12/2004 | Faris |
| 2005/0019634 A1 | 1/2005 | Legg |
| 2005/0019651 A1 | 1/2005 | Tsai |
| 2005/0031911 A1 | 2/2005 | Venkatesan |
| 2005/0084737 A1 | 4/2005 | Wine |
| 2005/0123815 A1 | 6/2005 | Tsai |
| 2005/0170245 A1 | 8/2005 | Vartak |
| 2005/0196656 A1 | 9/2005 | Gomez |
| 2005/0208343 A1 | 9/2005 | Kim |
| 2005/0233191 A1 | 10/2005 | Ushio |
| 2006/0003217 A1 | 1/2006 | Cohen |
| 2006/0024551 A1 | 2/2006 | Smotkin |
| 2006/0038536 A1 | 2/2006 | Lafollette |
| 2006/0076295 A1 | 4/2006 | Leonard |
| 2006/0127731 A1 | 6/2006 | Faris |
| 2006/0210867 A1 | 9/2006 | Kenis |
| 2006/0228622 A1 | 10/2006 | Cohen |
| 2006/0234855 A1 | 10/2006 | Gorte |
| 2006/0269826 A1 | 11/2006 | Katz |
| 2006/0292407 A1 | 12/2006 | Gervasio |
| 2007/0020496 A1 | 1/2007 | Pelton |
| 2007/0048577 A1 | 3/2007 | Ringeisen |
| 2007/0077491 A1 | 4/2007 | Burchardt |
| 2007/0087265 A1 * | 4/2007 | Lai et al. ............. 429/110 |
| 2007/0092787 A1 | 4/2007 | WangChen |
| 2007/0120091 A1 | 5/2007 | Ovshinsky |
| 2007/0141415 A1 | 6/2007 | Yang |
| 2007/0141430 A1 | 6/2007 | Huang |
| 2007/0141432 A1 | 6/2007 | Wang |
| 2007/0141440 A1 | 6/2007 | Yang |
| 2007/0141450 A1 | 6/2007 | Yang |
| 2007/0154766 A1 | 7/2007 | Baik |
| 2007/0166602 A1 | 7/2007 | Burchardt |
| 2007/0184314 A1 | 8/2007 | Kagami |
| 2007/0224500 A1 | 9/2007 | White |
| 2007/0234900 A1 | 10/2007 | Soloveichik |
| 2007/0237993 A1 | 10/2007 | Carlsson |
| 2007/0248845 A1 | 10/2007 | Armstrong |
| 2007/0248868 A1 | 10/2007 | Haltiner |
| 2007/0259234 A1 | 11/2007 | Chua |
| 2007/0264550 A1 | 11/2007 | Zhang |
| 2007/0269695 A1 | 11/2007 | Yamazaki |
| 2007/0278107 A1 | 12/2007 | Barnett |
| 2007/0287034 A1 | 12/2007 | Minteer |
| 2008/0008911 A1 | 1/2008 | Stroock |
| 2008/0009780 A1 | 1/2008 | Leonard |
| 2008/0026265 A1 | 1/2008 | Markoski |
| 2008/0032170 A1 | 2/2008 | Wainright |
| 2008/0044721 A1 | 2/2008 | Heller |
| 2008/0145719 A1 | 6/2008 | Yang |
| 2008/0145721 A1 | 6/2008 | Shapiro |
| 2008/0145737 A1 | 6/2008 | Cai |
| 2008/0154101 A1 | 6/2008 | Jain |
| 2008/0231231 A1 | 9/2008 | Hartzog |
| 2008/0241617 A1 | 10/2008 | Sato |
| 2008/0252257 A1 | 10/2008 | Sufrin-Disler |
| 2008/0268341 A1 | 10/2008 | Zhang |
| 2009/0027006 A1 | 1/2009 | Vezzini |
| 2009/0081488 A1 | 3/2009 | Sato |
| 2009/0117429 A1 | 5/2009 | Zillmer |
| 2009/0167242 A1 | 7/2009 | Naganuma |
| 2009/0230921 A1 | 9/2009 | Hsu |
| 2009/0284229 A1 * | 11/2009 | Friesen et al. ............ 320/137 |
| 2009/0286149 A1 | 11/2009 | Ci |
| 2009/0305090 A1 | 12/2009 | Chuang |
| 2010/0062303 A1 | 3/2010 | Bae |
| 2010/0119883 A1 | 5/2010 | Friesen |
| 2011/0044528 A1 | 2/2011 | Tsuchiya |
| 2011/0305959 A1 | 12/2011 | Friesen |
| 2011/0316485 A1 | 12/2011 | Krishnan |
| 2012/0015264 A1 | 1/2012 | Friesen |
| 2012/0068667 A1 | 3/2012 | Friesen |

FOREIGN PATENT DOCUMENTS

| | | |
|---|---|---|
| EP | 0277937 A1 | 8/1988 |
| EP | 0589144 B1 | 9/1996 |
| GB | 1286173 A1 | 8/1972 |
| WO | 8905528 | 6/1989 |
| WO | 2008058165 | 5/2008 |
| WO | 2010/065890 A1 | 6/2010 |
| WO | 2011035176 | 3/2011 |
| WO | 2011044528 | 4/2011 |
| WO | 2011163553 A1 | 12/2011 |
| WO | 2011012364 A1 | 1/2012 |

OTHER PUBLICATIONS

Intl. Search Report and Written Opinion dated Jan. 23, 2012 of PCT/US2011/051213 filed Sep. 12, 2011 (9 pages).

Cherepy et al., "A Zinc/Air Fuel Cell for Electric Vehicles," IEEE publication, 1999, pp. 11-13.

Cohen et al., "Fabrication and preliminary testing of a planar membraneless microchannel fuel cell," J. Power Sources, 2005, 139, 96-105.

Ferrigno et al., "Membraneless Vanadium Redox Fuel Cell Using Laminar Flow," J. Am. Chem. Soc. 2002, 124, pp. 12930-12931.

Jayashree et al., "Air-Breathing Laminar Flow-Based Microfluidic Fuel Cell," J. Am. Chem. Soc., 2005, 127, pp. 16758-16759.

Jorne et al. "Journal of the Electrochemical Society," vol. 134 No. 6, pp. 1399-1402 (Jun. 1987).

Salloum et al., "Sequential flow membraneless microfluidic fuel cell with porous electrodes," Journal of Power Sources 180, 2008, pp. 243-252.

Smedley et al., "A regenerative zinc-air fuel cell," Journal of Power Sources, vol. 165, 2007, pp. 897-904.

Thirsk (Electrochemistry vol. 4 p. 16, Thirsk, ed. The Chemical Society Great Britain Oxford Alden Press 1974).

Chinese Office Action dated Dec. 31, 2014 for Appln. No. 201110274724.1.

Chinese Office Action dated May 19, 2015 for Appln. No. 201110274724.1.

* cited by examiner

ELECTROCHEMICAL CELL SYSTEM WITH A PROGRESSIVE OXYGEN EVOLVING ELECTRODE / FUEL ELECTRODE

This application claims priority to U.S. Provisional Application Ser. No. 61/383,510, incorporated herein in its entirety by reference.

FIELD OF THE INVENTION

The present invention relates to a rechargeable electrochemical cell system.

BACKGROUND OF THE INVENTION

Electrochemical cells are well known. An electrochemical cell includes an anode or fuel electrode at which a fuel oxidation reaction takes place, a cathode or oxidant electrode at which an oxidant reduction reaction takes place, and an ionically conductive medium for supporting the transport of ions. In some metal-air cells, such as those disclosed in U.S. Patent Application Publication Nos. 2009/0284229, 2011/0086278, and 2011/0189551, as well as in U.S. patent application Ser. No. 13/028,496, all of which are incorporated herein by reference in their entireties, the fuel electrode comprises a plurality of scaffolded electrode bodies, on which metal fuel is reduced and electrodeposited.

Electrochemical cell systems may comprise a plurality of electrochemical cells. In some such electrochemical cell systems, the fuel electrode of the first cell may be coupled to a first terminal, the oxidant electrode of each cell within the cell system may be connected to the fuel electrode of the subsequent cell, and the oxidant electrode of the last cell in the series may be connected to a second terminal. Thus, a potential difference is created within each individual cell, and because these cells are coupled in series, a cumulative potential difference is generated between the first and second terminals. These terminals connect to a load L, creating a potential difference that drives current.

Among other things, the present application endeavors to provide a more efficient and effective architecture for recharging and discharging electrochemical cells and electrochemical cell systems.

SUMMARY OF THE INVENTION

One aspect of the present invention provides a rechargeable electrochemical cell system for generating electrical current using a fuel and an oxidant. The cell system comprises an electrochemical cell. The electrochemical cell includes a fuel electrode comprising N permeable electrode bodies arranged in spaced apart relation in order 1 to N, wherein N is an integer greater than or equal to two. The fuel electrode comprises metal fuel on the permeable electrode bodies. The cell further includes an oxidant electrode spaced apart from the fuel electrode, and a charging electrode selected from the group consisting of (a) the oxidant electrode, and (b) a separate charging electrode spaced from the fuel and oxidant electrodes. The cell additionally includes an ionically conductive medium communicating the electrodes for conducting ions to support electrochemical reactions at the electrodes. In the cell, the fuel and oxidant electrodes are configured to, during a discharging mode, oxidize the metal fuel on the permeable electrode bodies and reduce the oxidant at the oxidant electrode, thus generating a potential difference for application to a load. The cell system additionally includes a plurality of switches for selectively coupling each electrode body 2 to N of the fuel electrode and the charging electrode to a power source, for application of an anodic potential during a re-charging mode in which a cathodic potential is applied to electrode body 1 by the power source. The cell system further comprises a controller configured to control the plurality of switches during the re-charging mode to manage application of the anodic potential from the power source to the permeable electrode bodies 2 to N and the charging electrode in a progressive manner so as to cause electrodeposition of the metal fuel, via reduction of reducible ions of the metal fuel from the ionically conductive medium, to grow progressively from electrode body 1 towards the charging electrode with the electrodeposition progressively connecting each subsequent electrode body 2 to N to the electrode body 1 for application of the cathodic potential to each subsequently connected electrode body. The management of the switches may further cause removal of the anodic potential from each subsequently connected electrode body, and application of the anodic potential to at least the subsequent electrode body unconnected by the electrodeposition, or the charging electrode where electrode body N has been connected by the electrodeposition, for oxidation of an oxidizable species of the oxidant.

Another aspect of the present invention provides for a method for charging an electrochemical cell. The electrochemical cell comprises a fuel electrode comprising N permeable electrode bodies arranged in spaced apart relation in order 1 to N, wherein N is an integer greater than or equal to two. The fuel electrode comprises metal fuel on the permeable electrode bodies. The cell further comprises an oxidant electrode spaced apart from the fuel electrode, and a charging electrode. The charging electrode is selected from the group consisting of (a) the oxidant electrode, and (b) a separate charging electrode spaced from the fuel and oxidant electrodes. The cell further includes an ionically conductive medium communicating the electrodes for conducting ions to support electrochemical reactions at the electrodes. In the cell, the fuel and oxidant electrodes are configured to, during a discharging mode, oxidize the metal fuel on the permeable electrode bodies and reduce the oxidant at the oxidant electrode, thus generating a potential difference for application to a load. The method comprises applying a cathodic potential to electrode body 1 by coupling electrode body 1 to a power source. The method further includes managing application of an anodic potential to electrode bodies 2 to N, by selectively coupling electrode bodies 2 to N to the power source for application of the anodic potential. Such managing may cause electrodeposition of the metal fuel, via reduction of reducible ions of the metal fuel from the ionically conductive medium, to grow progressively from electrode body 1 towards the charging electrode, with the electrodeposition progressively connecting each subsequent electrode body 2 to N to the electrode body 1 for application of the cathodic potential to each subsequently connected electrode body. The managing may also include removal of the anodic potential from each subsequently connected electrode body, and application of the anodic potential to at least the subsequent electrode body unconnected by the electrodeposition, or the charging electrode where electrode body N has been connected by the electrodeposition, for oxidation of an oxidizable species of the oxidant. The method may further include decoupling the power source to discontinue the charging.

Another aspect of the present invention provides an electrochemical cell system for generating electrical current using a metal fuel and an oxidant. The cell system includes an electrochemical cell comprising (i) a fuel electrode comprising N permeable electrode bodies arranged in spaced apart relation in order 1 to N, wherein N is an integer greater than or equal to two, the fuel electrode comprising metal fuel on the permeable electrode bodies, (ii) an oxidant electrode spaced apart from the fuel electrode, and (iii) an ionically conductive medium communicating the electrodes for conducting ions to support electrochemical reactions at the electrodes. The fuel and oxidant electrodes are configured to, during a discharging mode, oxidize the metal fuel on the permeable electrode bodies and reduce the oxidant at the oxidant electrode, thus generating a potential difference for application to a load. The electrochemical cell system also includes a plurality of switches for selectively coupling each electrode body 2 to N of the fuel electrode to the load, one or more sensors associated with the electrode bodies 2 to N, configured to determine the presence of consumable fuel on each electrode body 2 to N, and a controller configured to control the plurality of switches during the discharging mode so as to disconnect from the load each of the electrode bodies 2 to N which the one or more sensors detect has the fuel depleted therefrom.

Another aspect of the present invention includes a method for discharging an electrochemical cell system. The electrochemical cell system includes an electrochemical cell comprising (i) a fuel electrode comprising a plurality of permeable electrode bodies arranged in spaced apart relation, the fuel electrode comprising metal fuel on the permeable electrode bodies, (ii) an oxidant electrode spaced apart from the fuel electrode, and (iii) an ionically conductive medium communicating the electrodes for conducting ions to support electrochemical reactions at the electrodes. The fuel and oxidant electrodes are configured to, during a discharging mode, oxidize the metal fuel on the permeable electrode bodies and reduce the oxidant at the oxidant electrode, thus generating a potential difference for application to a load. The electrochemical cell system also includes a plurality of switches for selectively coupling each electrode body of the fuel electrode to the load, one or more sensors associated with the permeable electrode bodies, configured to determine the presence of consumable fuel on each of the permeable electrode bodies, and a controller configured to control the plurality of switches during the discharging mode so as to disconnect from the load each of the permeable electrode bodies which the one or more sensors detect has fuel depleted therefrom. The method includes discharging the electrochemical cell as connected to the load, so as to consume metal fuel from the permeable electrode bodies. The method also includes sensing, with the one or more sensors, depletion of the metal fuel from the one or more of the permeable electrode bodies. The method additionally includes disconnecting from the load, using the plurality of switches, each of the one or more of the permeable electrode bodies depleted of metal fuel. The method further includes continuing said discharging, sensing, and disconnecting until all metal fuel is depleted from the fuel electrode, or no further discharging is desired.

Other objects, features, and advantages of the present invention will become apparent from the following detailed description, the accompanying drawings, and the appended claims.

DETAILED DESCRIPTION OF THE ILLUSTRATED EMBODIMENTS OF THE INVENTION

Figure 1:
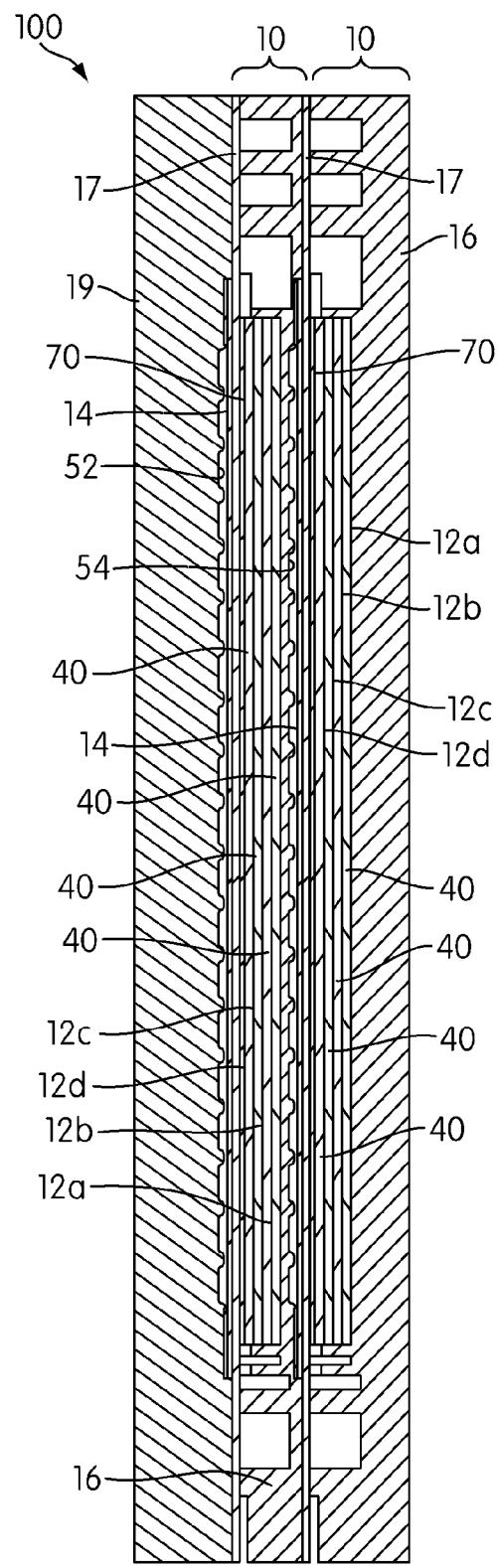
FIG. 1 illustrates a cross-sectional view of an electrochemical cell system that includes two electrochemical cells.
Figure 2:
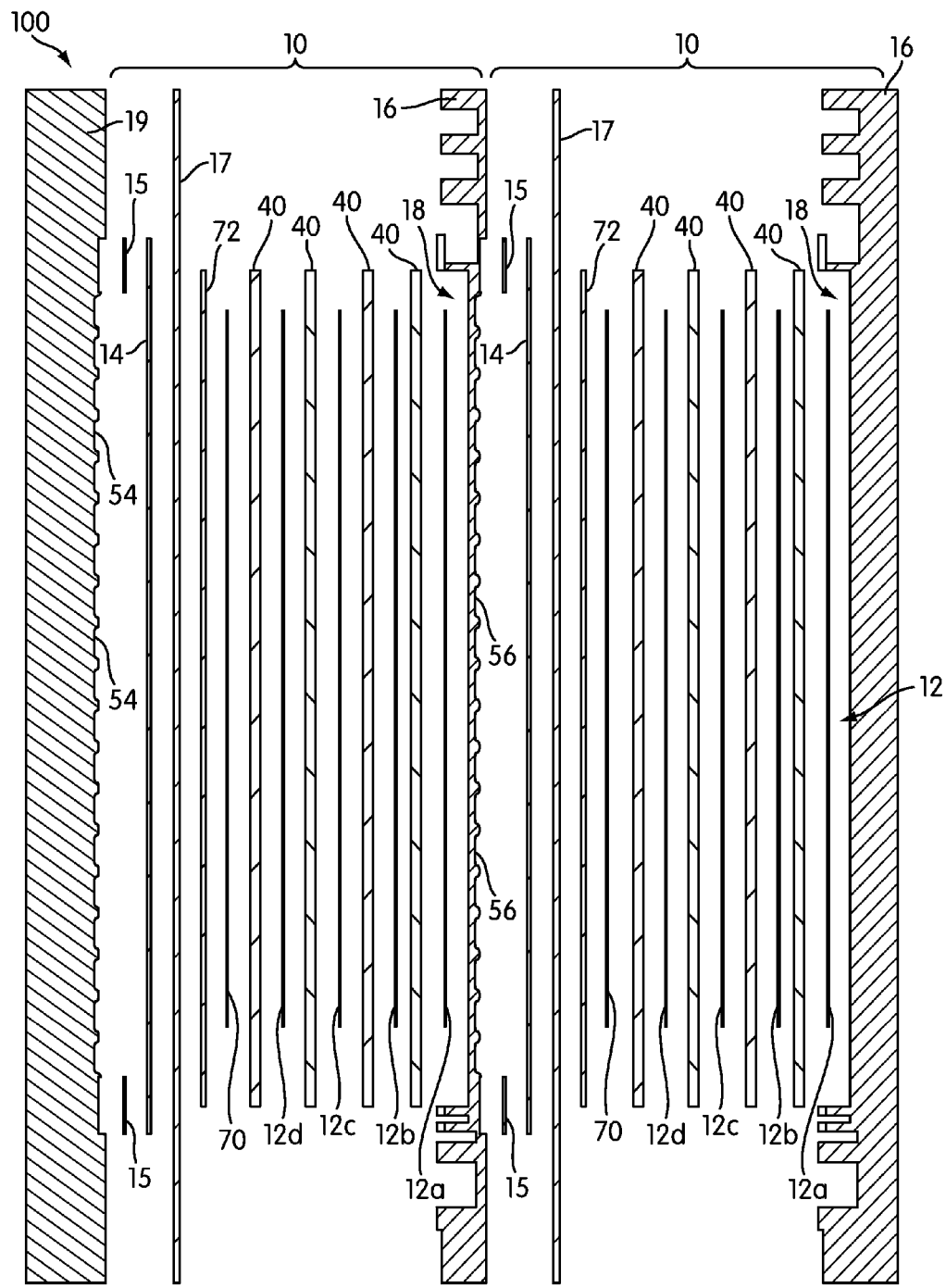
FIG. 2 illustrates an exploded view of the electrochemical cell system of FIG. 1.

FIGS. 1 and 2 illustrate an electrochemical cell system 100 that includes two electrochemical cells 10 configured to utilize a liquid ionically conductive medium therein, according to an embodiment of the invention. It may be appreciated that the electrochemical cell system 100 depicted herein is merely exemplary, and in other embodiments the functions or components of the electrochemical cells 10 or the electrochemical cell system 100 may vary. For example, in various embodiments, the ionically conductive medium may flow through multiple cells 10, or may circulate within a single cell 10. In some embodiments, the ionically conductive medium might generally not flow in the cell 10. It may be appreciated that portions of the electrochemical cell system 100, such as but not limited to one or more cells 10 therein, and/or the constituent portions thereof, may vary across embodiments. For example, various portions of each electrochemical cell 10 or other components of the electrochemical cell system 100 may be of any suitable structure or composition, including but not limited to being formed from plastic, metal, resin, or combinations thereof. Accordingly each cell 10 may be assembled in any manner, including being formed from a plurality of elements, being integrally molded, or so on. In various embodiments the cell(s) 10 and/or the housing(s) thereof may include elements or arrangements from one or more of U.S. patent application Ser. Nos. 12/385,217, 12/385,489, 12/549,617, 12/631,484, 12/776,962, 12/885,268, 13/028,496, 13/083,929, 61/358,339, 61/383,510, and 61/414,579, each of which are incorporated herein in their entireties by reference. As depicted in the illustrated embodiment of FIG. 1, however, each cell 10 includes a fuel electrode 12, and an oxidant electrode 14 that is spaced from the fuel electrode 12. The fuel electrode 12 supported by an electrode holder 16. The electrochemical system 100 also includes a cover 19 that is used to cover the electrochemical cells 10 on one side of the system 100, while one of the electrode holders 16 is used to cover the opposite side of the system 100, as illustrated in FIG. 1.

In an embodiment, the fuel electrode 12 is a metal fuel electrode that functions as an anode when the cell 10 operates in discharge, or electricity generating, mode, as discussed in further detail below. In an embodiment, the fuel electrode 12 may comprise a plurality of permeable electrode bodies 12a-d, such as screens that are made of any formation able to capture and retain, through electrodepositing, or otherwise, particles or ions of metal fuel from an ionically conductive medium that circulates in the cell 10, as discussed in further detail below. Components of the cell 10, including for example, the fuel electrode 12, the permeable electrode bodies 12a-d thereof, and the oxidant electrode 14, may be of any suitable construction or configuration, including but not limited to being constructed of Nickel or Nickel alloys (including Nickel-Cobalt, Nickel-Iron, Nickel-Copper (i.e. Monel), or superalloys), Copper or Copper alloys, brass, bronze, or any other suitable metal. In an embodiment, a catalyst film may be applied to some or all of the permeable electrode bodies 12a-d and/or the oxidant electrode 14, and have a high surface material that may be made of some of the materials described above. In an embodiment, the catalyst film may be formed by techniques such as thermal spray, plasma spray, electrodeposition, or any other particle coating method.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 10 as particles suspended in the ionically conductive medium. In some embodiments, a metal hydride fuel may be utilized in cell 10.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide. In an embodiment, the ionically conductive medium may comprise an electrolyte. For example, a conventional liquid or semi-solid electrolyte solution may be used, or a room temperature ionic liquid may be used, as mentioned in U.S. patent application Ser. No. 12/776, 962, the entirety of which is incorporated herein. In an embodiment where the electrolyte is semi-solid, porous solid state electrolyte films (i.e. in a loose structure) may be utilized.

The fuel may be oxidized at the fuel electrode 12 when the fuel electrode 12 is operating as an anode, and an oxidizer, such as oxygen, may be reduced at the oxidant electrode 14 when the oxidant electrode 14 is operating as a cathode, which is when the cell 10 is connected to a load L and the cell 10 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide, may be reversibly reduced and deposited as the fuel, e.g., zinc, onto at least a portion of the fuel electrode 12 that functions as a cathode during recharge mode. During recharge mode, either the oxidant electrode 14 or a separate charging electrode 70 (which may be of similar construction or configuration as permeable electrode bodies 12a-d in some embodiments), and/or another portion of the fuel electrode 12, as described below, functions as the anode. The switching between discharge and recharge modes is discussed in further detail below.

Figure 3:
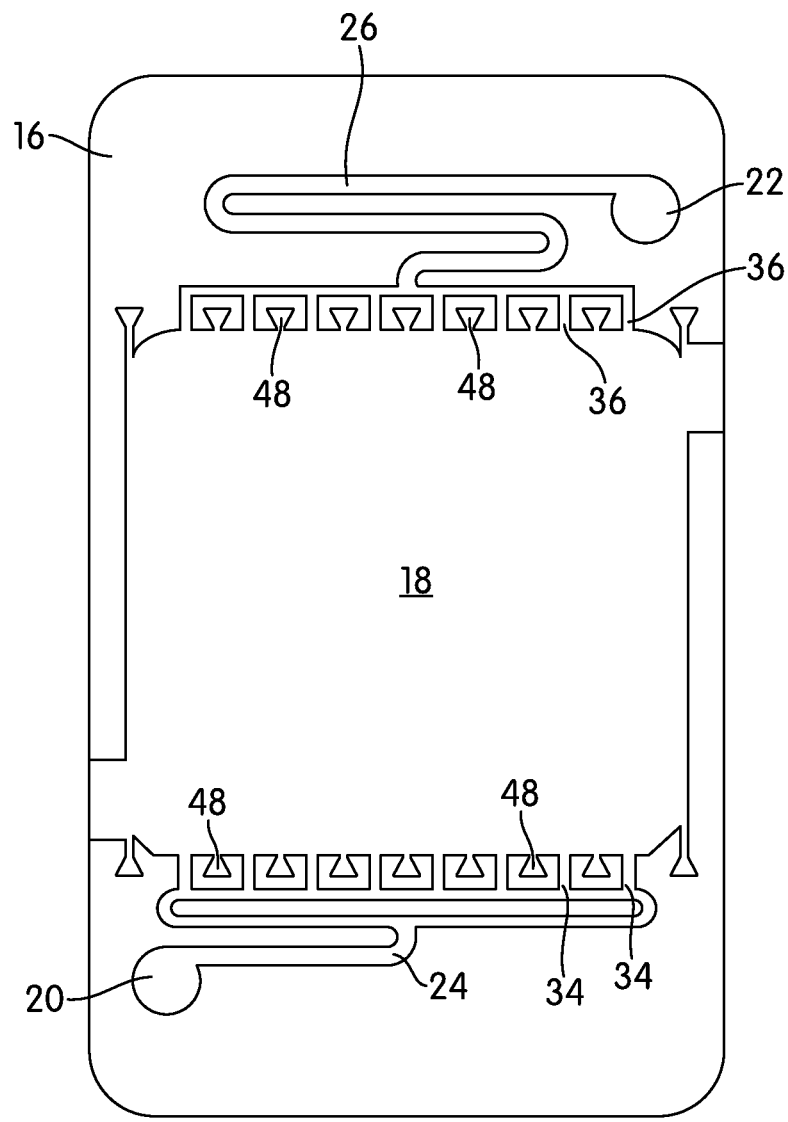
FIG. 3 illustrates an electrode holder of one of the electrochemical cells of FIG. 1.

The electrode holder 16 defines a cavity 18 in which the fuel electrode 12 is held. The electrode holder 16 also defines an inlet 20 and an outlet 22 for the cell 10. The inlet 20 is configured to allow the ionically conductive medium to enter the cell 10 and/or recirculate through the cell 10. The inlet 20 may be connected to the cavity 18 via an inlet channel 24, and the outlet 22 may be connected to the cavity 18 via an outlet channel 26. As illustrated in FIG. 3, the inlet channel 24 and the outlet channel 26 may each provide a meandering tortuous path through which the ionically conductive medium may flow. The meandering path defined by the inlet channel 24 preferably does not include any sharp corners in which the flow of the medium may become stagnated or in which any particulates in the medium may collect. As discussed in further detail below, the length of the channels 24, 26 may be designed to provide an increased ionic resistance between cells that are fluidly connected in series.

For each cell 10, a permeable seal member 17 may be bonded between sealing surfaces on the electrode holders 16 and/or the cover 19, as appropriate, to enclose at least the fuel electrode 12 in the cavity 18. The seal member 17 also covers the inlet and outlet channels 24, 26. The seal member 17 is non-conductive and electrochemically inert, and is preferably designed to be permeable to the ionically conductive medium in the orthogonal direction (i.e., through its thickness), without permitting lateral transport of the ionically conductive medium. This enables the ionically conductive medium to permeate through the seal member 17 for enabling ion conductivity with the oxidant electrode 14 on the opposing side to support the electrochemical reactions, without "wicking" the ionically conductive medium laterally outwardly from the cell 10. A few non-limiting examples of a suitable material for the seal member 17 are EPDM and TEFLON®.

In the illustrated embodiment, the cavity 18 has a generally rectangular, or square, cross-section that substantially matches the shape of the fuel electrode 12. The cavity 18 may be connected to the inlet channel 24 by a plurality of inlets 34 so that when the ionically conductive medium and precipitates or reducible fuel species enter the cavity 18, the ionically conductive medium and fuel are distributed along a side of the fuel electrode 12. In some embodiments, one side of the cavity 18, specifically, the side of the cavity 18 that is connected to the inlet channel 24, may include a plurality of fluidization zones, such as is described in U.S. Patent Application Publication No. 2011/0086278, incorporated herein in its entirety by reference. In other embodiments, the ionically conductive medium may enter the cavity 18 through a diffuser, such as is described in U.S. Patent Application Publication No. 2011/189551, also incorporated herein in its entirety by reference.

Figure 4:
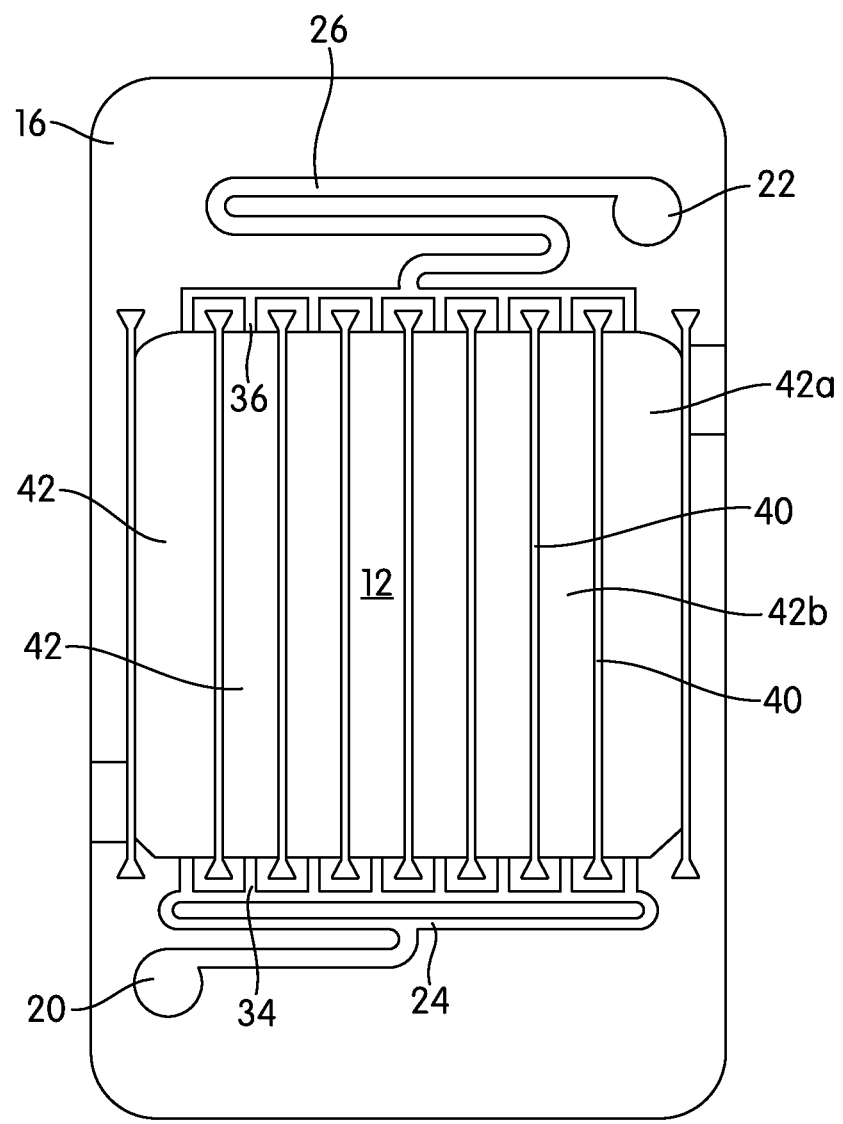
FIG. 4 illustrates the electrode holder of FIG. 3, holding a fuel electrode and a plurality of spacers connected to the electrode holder

As illustrated in FIG. 4, a plurality of spacers 40, each of which extends across the fuel electrode 12 in a spaced relation to each other, may be connected to the electrode holder 16 so that the fuel electrode 12 may be held in place relative to the electrode holder 16 and to the oxidant electrode 14. In an embodiment, the plurality of permeable electrode bodies 12a-12d, as illustrated in FIG. 2, may be separated by sets of the plurality of spacers 40, so that each set of spacers 40 is positioned in between adjacent electrode bodies to electrically isolate the electrode bodies 12a-12d from each other. Within each set of spacers 40 between adjacent electrode bodies, the spacers 40 are positioned in a spaced relation in a manner that creates so-called "flow lanes" 42 therebetween, as discussed in greater detail below. The flow lanes 42 are three-dimensional and have a height that is substantially equal to the height of the spacers 40. In an embodiment, the spacers 40 may be provided by a single frame that has cut-outs corresponding to the flow lanes. In an embodiment, the flow lanes 42 may include a foam or honeycomb-type structure that is configured to allow the ionically conductive medium to flow therethrough. In an embodiment, the flow lanes 42 may include an array of pins that are configured to disrupt the flow of the ionically conductive medium through the flow lanes. In an embodiment, the frame, spacers 40, flow lanes 42, and/or other elements of cell 10 may be defined by plastic formed by injection molding, or epoxy/insulating material formed using chemical processes. The illustrated embodiment is not intended to by limiting in any way.

The spacers 40 are non-conductive and electrochemically inert so they are inactive with regard to the electrochemical reactions in the cell 10. The spacers 40 are preferably sized so that when they are connected to the electrode holder 16, the spacers 40 are in tension, which allows the spacers 40 to press against the fuel electrode 12, or one of the electrode bodies 12a-12c, so as to hold the fuel electrode 12 or bodies thereof in a flat relation relative to the electrode holder 16. The spacers 40 may be made from a plastic material, such as polypropylene, polyethylene, noryl, fluoropolymer, etc. that allows the spacers 40 to be connected to the electrode holder 16 in tension.

Figure 5:
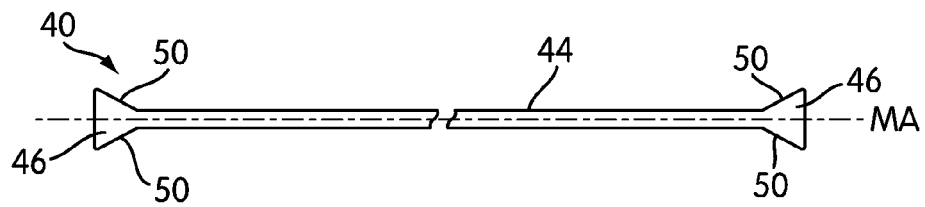
FIG. 5 illustrates one of the spacers of FIG. 4 in greater detail.
Figure 6:
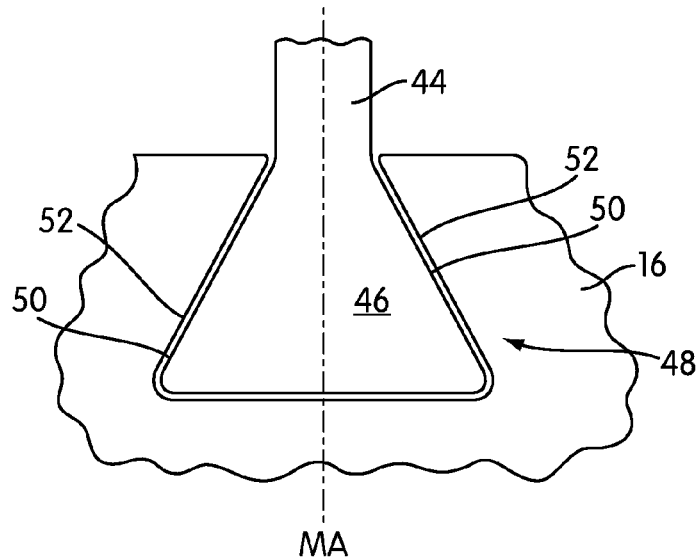
FIG. 6 illustrates a connection between the spacers of FIG. 5 and the electrode holder of FIG. 3 in greater detail.

In the embodiment illustrated in FIG. 5, each spacer has an elongated middle portion 44, and a shaped connecting portion 46 at each end. The shaped connecting portions 46 are configured to be held by openings 48 having substantially similar shapes in the electrode holder 16, as illustrated in FIG. 6. In the illustrated embodiment, the shaped portions 46 and the openings 48 have a substantially triangular shape, although the illustrated shape is not intended to be limiting in any way. The substantially triangular shape provides surfaces 50 on opposite sides of the elongated portion 44 of the spacer 40 that are configured to contact corresponding surfaces 52 on the electrode holder 16. Because the surfaces 50, 52 are angled with respect to a major axis MA of the elongated portion 44 of the spacer 40 and the tension in the spacer 40 will be along the major axis MA, the forces created by the tension may be distributed across a larger surface, as compared to a shaped portion having a circular or square shape with the same area.

Once the spacers 40 have been connected to the electrode holder 16 via the end portions 46, the flow lanes 42 are defined across the cavity 18 of the electrode holder 16. The spacers 40 are configured to essentially seal off one flow lane 42a from an adjacent flow lane 42b, that is separated by one of the spacers 40 so that the ionically conductive medium is guided to generally flow in substantially one direction. Specifically, the ionically conductive medium may generally flow in a first direction FD across the fuel electrode 12, from the inlet channel 24 to the outlet channel 26. A suitable pressure drop is generated between the inlet channel 24 and the inlets 34 so that the ionically conductive medium may flow across the cavity 18 and to the outlet channel 26, even when the cell 10 is oriented such that the flow is substantially upward and against gravity. In an embodiment, the ionically conductive medium may also permeate through the fuel electrode 12, or an individual permeable electrode body 12a-12d, in a second direction SD and into a flow lane that is on the opposite side of the fuel electrode 12 or permeable electrode body 12a-12d.

Figure 7:
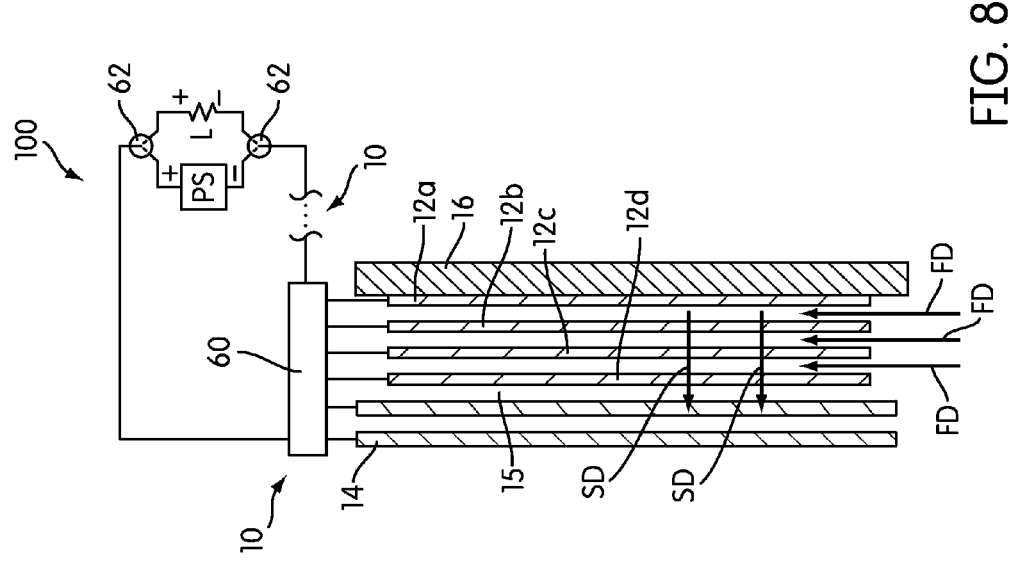
FIG. 7 schematically illustrates electrical connections between the electrochemical cell and an external load or power supply according to an embodiment of a cell system of the present invention.

As illustrated in the embodiment of FIG. 7, the fuel electrode 12 of cell 10 in electrochemical cell system 100 may be selectively connected to an external load L so that electrons given off by the fuel as the fuel is oxidized at the fuel electrode 12 may flow to the external load L. A switching system 60 comprising a plurality of switches, may selectively electrically connect each of the individual permeable electrode bodies 12a-12d of the fuel electrode 12, and may also selectively connect the permeable electrode bodies 12a-12d to the oxidant electrode 14. As shown, in some embodiments electrochemical cell system 100 may further comprise other cells 10. In an embodiment, the switching system 60 may comprise a terminal selector system 62 configured to couple or decouple the external load L for use in discharging the cell 10, or couple or decouple a power supply PS for use in charging the cell 10. In another embodiment the switching system 60 and the terminal selector system 62 may be separate, but may, in an embodiment, communicate with each other. The switching system 60 is discussed in greater detail below.

The oxidant electrode 14 functions as a cathode when the oxidant electrode 14 is connected to the external load L and the cell 10 operates in discharge mode. When functioning as a cathode, the oxidant electrode 14 is configured to receive electrons from the external load L and reduce an oxidizer that contacts the oxidant electrode 14. The oxidizer may be any species of the oxidant available for oxidation at the charging electrode. For example, the species may be a free ion, or an ion bonded to or coordinated with other ions or constituents in the ionically conductive medium. In an embodiment, the oxidant electrode 14 comprises an air breathing electrode and the oxidizer comprises oxygen in the surrounding air.

The oxidizer may be delivered to the oxidant electrode 14 by a passive transport system. For example, where oxygen present in ambient air is the oxidizer, simply exposing the oxidant electrode 14 to ambient air via openings in the cell, such as the openings that are provided by grooves 54 in the cover 19 and grooves 56 in the electrode holder 16 provided in the center of the electrochemical cell system 100, may be sufficient to allow diffusion/permeation of oxygen into the oxidant electrode 14. Other suitable oxidizers may be used and embodiments described herein are not limited to the use of oxygen as the oxidizer. A peripheral gasket 15 may be positioned between the periphery of the oxidant electrode 14 and the cover 19 or electrode holder 16, as appropriate, to prevent the ionically conductive medium from leaking around the oxidant electrode 14 and into the area in the grooves 54, 56 for air exposure.

In other embodiments, a pump, such as an air blower, may be used to deliver the oxidizer to the oxidant electrode 14 under pressure. The oxidizer source may be a contained source of oxidizer. In an embodiment, the oxygen may be recycled from the cell 10, such as is disclosed in U.S. patent application Ser. No. 12/549,617, incorporated in its entirety herein by reference. Likewise, when the oxidizer is oxygen from ambient air, the oxidizer source may be broadly regarded as the delivery mechanism, whether it be passive or active (e.g., pumps, blowers, etc.), by which the air is permitted to flow to the oxidant electrode 14. Thus, the term "oxidizer source" is intended to encompass both contained oxidizers and/or arrangements for passively or actively delivering oxygen from ambient air to the oxidant electrode 14.

Electricity that can be drawn by the external load L is generated when the oxidizer at the oxidant electrode 14 is reduced, while the fuel at the fuel electrode 12 is oxidized to an oxidized form. In some embodiments, the electrical potential of the cell 10 is depleted once the fuel at the fuel electrode 12 is entirely oxidized or oxidation is arrested due to passivation of the fuel electrode. A portion of the switching system 60 may be positioned in between the oxidant electrode 14 and the load L so that the oxidant electrode 14 may be connected and disconnected from the load L, as desired. Again, more details about the switching system 60, and the electrical configuration thereof, is provided below.

To limit or suppress hydrogen evolution at the fuel electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. Other additives may also or alternatively be added to the ionically conductive medium, including, but not limited to additives which enhance the electrodeposition process of the metal fuel on the fuel electrode 12, such as is described in U.S. patent application Ser. No. 13/028,496, incorporated in its entirety herein by reference.

After the fuel in the cell 10 has been entirely oxidized, or whenever it is desirable to regenerate the fuel within the cell 10 by reducing oxidized fuel ions back to fuel, the fuel electrode 12 and the oxidant electrode 14 may be decoupled from the external load L and coupled to a power supply PS. As noted above, such connections may be made, for example, with the use of the switching system 60 and the terminal selector system 62.

The power supply PS is configured to charge the cell 10 by applying a potential difference between the fuel electrode 12 and the oxidant electrode 14 such that the reducible species of the fuel is reduced and electrodeposited onto at least one of the permeable electrode bodies 12a-12d and the corresponding oxidation reaction takes place at the oxidant electrode 14, which is typically oxidation of an oxidizable species to evolve oxygen, which may be off-gassed from the cell 10. In an embodiment wherein oxygen is the oxidant, oxygen ions in an aqueous electrolytic solution are oxidized. The oxygen ions may be available from an oxide of the fuel (e.g., ZnO when zinc is the fuel), hydroxide ions ($OH^-$), or water molecules ($H_2O$). As described in detail in U.S. patent application Ser. No. 12/385,489, which has been incorporated herein by reference, in an embodiment only one of the permeable electrode bodies, such as 12a, is connected to the power supply PS so that the fuel reduces onto the permeable electrode body and progressively grows to and on the other permeable electrode bodies 12b-12d, one by one. The switching system 60 may control how the permeable electrode bodies 12a-12d and the oxidant electrode 14 participate in the electrochemical reactions of the cell, as is described in greater detail below.

Figure 8:
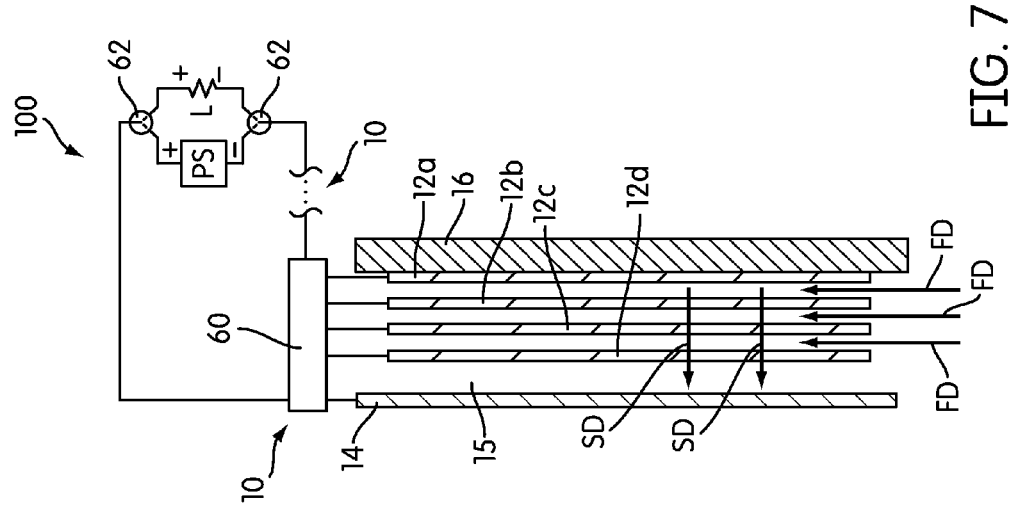
FIG. 8 schematically illustrates electrical connections between the electrochemical cell and an external load or power supply according to an embodiment of a cell system of the present invention.

FIG. 8 shows an embodiment where a separate charging electrode 70 of cell 10 in electrochemical cell system 100 is provided to function as the charging electrode, rather than the oxidant electrode 14. Again, in some embodiments other cells 10 may be part of electrochemical cell system 100, as shown. As illustrated in FIG. 2, the separate charging electrode 70 may be positioned between the fuel electrode 12 and the oxidant electrode 14, with a spacer 72 and the seal member 17 being positioned between the separate charging electrode 70 and the oxidant electrode 14. The spacer 72 is non-conductive and has openings through which the ionically conductive medium may flow.

In the embodiment described above with respect to FIG. 7, the oxidant electrode 14 functions as the cathode during power generation/discharge, and as the anode during charging, as described above. In FIG. 8, the oxidant electrode 14 remains the cathode during power generation/discharge, but may be disconnected during charging, while the separate charging electrode 70 is connected to the power supply PS to function as the anode. During current generation, the fuel on the fuel electrode 12 is oxidized, generating electrons that are conducted to power the load L and then conducted to the oxidant electrode 14 for reduction of the oxidizer (as discussed in more detail above). In embodiments comprising the separate charging electrode 70, the switching system 60 may control how the permeable electrode bodies 12a-12d the oxidant electrode 14, and the separate charging electrode 70 participate in the electrochemical reactions of the cell, as is described in greater detail below.

It is also possible in any of the embodiments of the invention to apply the cathodic potential to any or all of the electrode bodies 12a-12d of the fuel electrode 12, rather than to just one to produce body-by-body progressive growth. Progressive growth emanating from one terminal is advantageous because it provides more density of the electrodeposited fuel. Specifically, the growth in the previously connected electrode bodies continues as each subsequent body is connected by the progressing growth. This and other advantages are discussed in greater detail in U.S. patent application Ser. No. 12/385,489, which has been incorporated herein by reference. With all the electrode bodies subject to the same potential, the growth will only occur until a short occurs between the charging electrode, which is the oxidant electrode 14 in the embodiment of FIG. 7 and the separate charging electrode 70 in the embodiment of FIG. 8, and the electrode body proximate to it. Thus, it is possible to have a faster, but less dense, growth in this manner, which may be amenable to certain re-charging needs.

The embodiments illustrated in FIGS. 7 and 8 should not be considered to be limiting in any way and are provided as non-limiting examples of how the cell 10 may be configured to be rechargeable. The recharge mode of the present invention, in the context of the switching system 60, is discussed in greater detail below. As another example, United States Patent Application Publication No. 2011/0070506, the entire content of which is incorporated herein by reference, describes embodiments of a rechargeable electrochemical cell system with charge/discharge mode switching in the cells.

Returning to FIG. 4, after the ionically conductive medium has passed through the fuel electrode 12, the medium may flow into the outlet channel 26 that is connected to the outlets 36 of the cavity 18 of the electrode holder 16 and the outlet 22. The outlet 22 may be connected to the inlet 20 in embodiments where the medium is recirculated in the cell 10, or to an inlet of an adjacent cell, as discussed in further detail below, when a plurality of cells 10 are fluidly connected in series. In an embodiment, the outlet 22 may be connected to a vessel to collect the medium that has been used in the cell 10.

The cells 10 illustrated in FIGS. 1 and 2 may be fluidly connected in series. Details of embodiments of cells that are connected in series are provided in U.S. patent application Ser. No. 12/631,484, filed Dec. 4, 2009 and incorporated herein by reference in its entirety. The outlet 22 of a first cell 10 may be fluidly connected to the inlet 20 of a second cell 10, and the outlet 22 of the second cell 10 may be connected to the inlet 20 of a third cell, and so on. Although the embodiment of FIGS. 1 and 2 illustrates two cells 10, additional cells may be stacked and fluidly connected to the illustrated cells. Due to the meandering, tortuous paths that are created by the inlet channel 24 and the outlet channel 26, described above and illustrated in FIGS. 3 and 4, the length of the flow passageways for the medium via the channels 24, 26 is greater than the distance between the fuel electrode 12 and the oxidant electrode 14 in each of the cells 10. This creates an ionic resistance between the pair of fluidly connected cells that is greater than an ionic resistance within an individual cell 10. This may reduce or minimize internal ionic resistance loss of the stack of cells 100, as discussed in U.S. patent application Ser. No. 12/631,484.

In an embodiment of operation, the fuel electrode 12, which already has metal fuel deposited thereon, is connected to the load L and the oxidant electrode 14 is connected to the load L. The ionically conductive medium enters the inlet 20 under positive pressure and flows through the inlet channel 24, the inlets 34 of the cavity 18, and into the flow lanes 42. The ionically conductive medium flows across the permeable electrode bodies 12a-12d in the flow lanes 42 defined by the elongated middle portions 22 of the spacers 40. The ionically conductive medium may also permeate through the permeable electrode bodies 12a-12d of the fuel electrode 12. The ionically conductive medium simultaneously contacts the fuel electrode 12 and the oxidant electrode 14, thereby allowing the fuel to oxidize and conduct electrons to the load L, while the oxidizer is reduced at the oxidant electrode 14 via the electrons that are conducted to the oxidant electrode 14 by the load L. After the ionically conductive medium has passed through the flow lanes 42, the medium flows out of the cavity 18 via the outlets 36 of the cavity 18, through the outlet channel 24, and out the outlet 22 of the cell 10.

When the potential of the cell 10 has been depleted or when it is otherwise desirable to recharge the cell 10, the fuel electrode 12 is connected to the negative terminal of the power supply PS and the charging electrode, which may be the oxidant electrode 14 or the separate charging electrode 70, is connected to the positive terminal of the power supply PS. Such connections may again be through the switching system 60, discussed below. In the charging or recharge mode, a cathode portion of the fuel electrode 12 becomes the cathode and an anode portion of the fuel electrode 12 and/or the charging electrode 14, 70 becomes the anode, as is described in greater detail below. By providing electrons to a cathode portion of the fuel electrode 12, fuel ions may reduce into fuel and redeposit onto the permeable electrode bodies 12a-12d, as is described in greater detail below, while the ionically conductive medium circulates through the cell 10 in the same manner as described above with respect to the discharge mode.

The flow lanes 42 provide directionality and distribution of the ionically conductive medium across the fuel electrode 12. The flow lanes 42 may also prevent the particulates from settling and/or covering the electrodes. When the cell 10 is in charging mode, the improved distribution of the particulates across the fuel electrode 12 allows for a more uniform deposition of the reduced fuel onto the fuel electrode 12, which improves the density of the fuel on the fuel electrode 12, and increases the capacity and energy density of the cell 10, thereby enhancing the cycle-life of the cell 10. In addition, by having the ability to control the distribution of the precipitates or reaction by-product during discharge, early passivation/deposition of the by-product on the fuel electrode 12 may be prevented. Passivation leads to lower fuel utilization and lower cycle life, which is undesirable.

The examples of FIGS. 1-8 are not limiting, and are provided solely for context to understand general principles of an embodiment of the cells 10 of the cell system 100. Any cell construction or configuration may be used. With an understanding of the cell system provided, attention is turned to the configuration and operation of the switching system 60 of the invention.

As noted, during a charging mode for the cell 10, a potential difference is applied across electrodes in the cell 10. Although either the oxidant electrode 14 or the separate charging electrode 70 generally function as the anode during charging, an anodic potential may be applied to other electrodes, such as some of the electrode bodies in the fuel electrode 12. Likewise, during charging a cathodic potential may be initially applied to electrode body 12a of the fuel electrode 12, but may also be initially applied to one or more of the other permeable electrode bodies 12b-12d of the fuel electrode 12. As such, those permeable electrode bodies 12a-12d of fuel electrode 12 having a cathodic potential behave as a cathode during charge, and serve as a reduction site for a reducible fuel species, such as the oxidized fuel ions created in the cell during discharging.

As the reducible fuel species is reduced on those of permeable electrode bodies 12a-12d having the cathodic potential, the oxidant electrode 14 or the separate charging electrode 70 and/or those of the permeable electrode bodies 12b-12d having the anodic potential will oxidize an oxidizable oxygen species, such as the reduced oxidant species created in the cell during discharging. Thus, when the cell 10 is a metal-air cell, the reducible metal fuel species is being reduced and electrodeposited on some of the permeable electrode bodies 12a-12d of the fuel electrode 12, and the oxidizable oxygen species is being oxidized to oxygen gas, which may be off-gassed from the cell 10. In this embodiment, those electrodes and electrode bodies having an anodic potential may be considered an oxygen evolving electrode (OEE).

To determine which of the electrodes (i.e. permeable electrode bodies 12a-d, the oxidant electrode 14 and/or the separate charging electrode 70) have anodic potentials or cathodic potentials during charging, electrical connections therebetween may be controlled by the switching system 60, as is discussed in greater detail below.

It may be advantageous to the fuel growth for the potential difference used to charge the cell 10 to be applied between adjacent bodies in the cell 10, such that an electrode body having the anodic potential is adjacent to an electrode body having the cathodic potential. Once sufficient fuel growth has occurred on the electrode body having the cathodic potential, the electrode having the anodic potential may change, so that the permeable electrode body that previously was part of a set of electrode bodies having an anodic potential may become part of a set of electrode bodies having the cathodic potential. In an embodiment wherein there are N permeable electrode bodies, the application of the anodic potential from the power source to permeable electrode bodies 2 to N and the charging electrode may comprise connecting all of the electrode bodies plus the charging electrode together at the same time, then disconnecting each of electrode bodies 2 to N in order. Alternatively, in an embodiment, the application of the anodic potential from the power source to permeable electrode bodies 2 to N and the charging electrode could comprise connecting and disconnecting each of the electrode bodies and the charging electrode individually in order (such that electrode body 2 is connecting to the anodic potential, then is disconnected and electrode 3 is connected to the anodic potential, and so on until the charging electrode is finally connected to complete the growth).

In an embodiment, the charging electrode may merely be the last electrode to receive the anodic potential during charging. For example, the charging electrode could be the oxidant electrode or a separate electrode. When the charging electrode is a separate electrode, it could have a specialized construction different from the electrode bodies of the fuel electrode, or could be the same as the permeable electrode bodies (i.e. just one more electrode body), but for the fact that growth of the fuel during charging does not continue past it.

In the above-described embodiment illustrated in FIGS. 1-2, the progressive changing of which electrode(s) have the anodic potential may follow the fuel growth through each of the permeable electrode bodies 12a-12d, so that an electrode having an anodic potential remains the electrode body spaced adjacent to an electrode having the cathodic potential. As shown in the embodiments of the following Figures, the switch system 60 may be configured to selectively connect and disconnect the various electrodes and electrode bodies to maintain the adjacent positions of the anodic potential and the cathodic potential.

FIGS. 9-12 show embodiments of the switching system 60 of the cell 10. The cell 10 is connectable to the power supply PS, the load L, or to other cells 10 in series, through a first terminal 130 and a second terminal 140, wherein the first terminal 130 is negative (cathodic) during recharging, and the second terminal 140 is positive (anodic) during recharging. As shown, the cell 10 has a fuel electrode 12 comprising permeable electrode bodies 12a-12d, a charging electrode 70, and an oxidant electrode 14. In an embodiment, the plurality of switches may selectively couple at least some of the permeable electrode bodies 12b-12d to a power source, such as power supply PS, for application of an anodic potential during a recharging mode of the cell 10, in which a cathodic potential is applied to at least electrode body 12a, as will be described in greater detail below.

Figure 9:
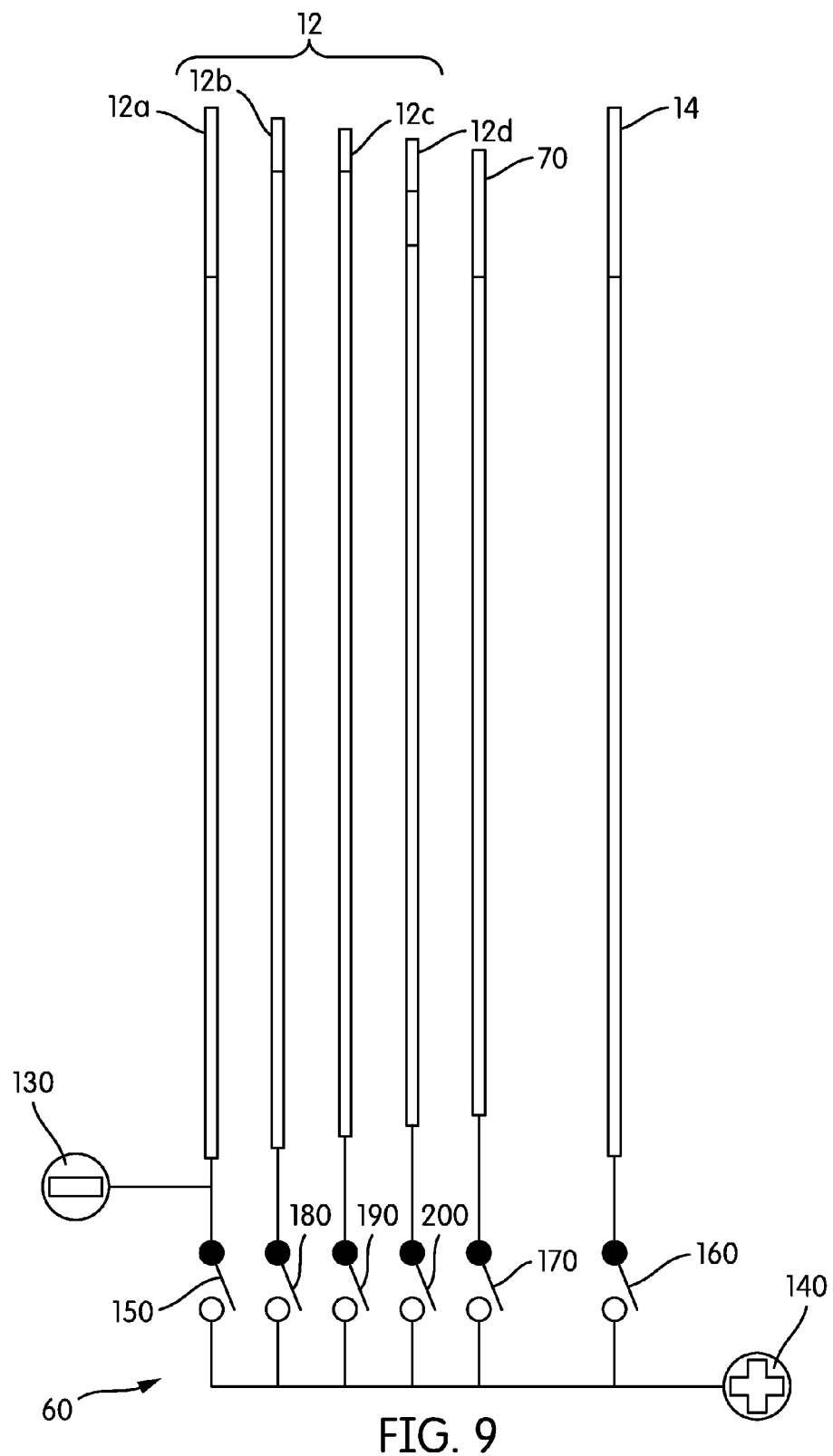
FIG. 9 schematically illustrates a switching system according to an embodiment of the cell system of FIG. 8.

In FIG. 9, the switching system 60 includes a bypass switch 150, configured to provide a direct connection between the first terminal 130 and the second terminal 140. The bypass switch 150 may be similar to that described in United States Patent Application Publication No. 2011/0070506, which has been incorporated herein in its entirety by reference. A cell 10 can be bypassed with bypass switch 150 for a number of reasons that affect the performance of the stack.

For example, a short between charging electrode 70 and the electrode bodies 12a-12d having a cathodic potential during charge (detected by voltage measurement as described below) may lead to expense of parasitic power during charge. An electrical short may lead to a sudden drop in voltage between the charging and fuel electrodes as the current is shunted between the charging and fuel electrodes. Another example is during discharge, where any cell 10 that has a higher kinetic or ohmic loss affects the round trip efficiency and discharge power of the stack. Also, consumption of fuel in the cell 10 during discharge earlier than other cells 10 can lead to voltage reversal in the cell 10 and stack power loss, and can be prevented by bypassing the cell 10 when the discharge voltage falls below a critical value. Complete consumption of zinc or other fuel during discharge leads to a sudden drop in voltage between the fuel and oxidant electrodes. Any other criteria to detect the performance of cells 10 may be used, and the examples herein are not limiting. Certain cells 10 may not meet performance requirements (for example, maximum power during discharge) due to yield issues and problems related to fabrication and assembly of electrodes. These cells 10 can be permanently placed in bypass mode. Other cells 10 may meet performance requirements initially, however may have cycle life issues and can be placed in bypass mode after the performance falls below a required limit. Thus, bypassing a cell 10 through bypass switch 150 provides an option to increase reliability and performance of the stack.

The switching system 60 of FIG. 9 also includes an oxidant electrode switch 160 associated with the oxidant electrode 14. The oxidant electrode switch 160 would be closed during discharge, so that an electric potential across the fuel electrode 12 and the oxidant electrode 14 may allow a current to be drawn by a load connected between the first terminal 130 and the second terminal 140, which during discharge would have positive and negative polarities respectively.

A charging electrode switch 170 may be associated with the charging electrode 70, such that the charging electrode 70 may be electrically connected to the second terminal 140 when the power supply PS is connected between the first terminal 130 and the second terminal 140. As discussed below, the charging electrode 70 may not always have an anodic potential applied to it, and in an embodiment may only have an anodic potential when fuel growth between it and electrode body 12d is desired. Also shown are switches 180, 190, and 200, associated with electrode bodies 12b-12d respectively, all of which are configured to connect electrode bodies 12b-12d to the second terminal 140 as well.

As was noted, it is advantageous that an electrode having an anodic potential be adjacent to an electrode having a cathodic potential, so that growth on the electrode having the cathodic potential is enhanced. Such enhancement may, for example, include greater density of fuel growth than if the electrode having the anodic potential is further from the closest electrode having the cathodic potential (i.e. if a neutral electrode separates the electrodes having the anodic and cathodic potentials). This enhanced density may be due to the initial dendrites that first contact the anodic body being disrupted because they lack sufficient cross-section to carry the current between the anodic and cathodic bodies. That is, they burn off similarly to a fuse element subject to excess current. This delays shorting between the anodic and cathodic bodies, which takes place when the density has increased further to provide dendrites of sufficient cross-sectional area (individually and/or collectively) to enable the current conduction without disruption. Another advantage may be lower electrolyte IR loss in configurations where the distance between the charging electrode 70 and the fuel electrode 12 is lower, as compared to configurations wherein the electrode having the anodic potential is further from the closest electrode having the cathodic potential (i.e. where neutral electrodes separate the electrodes having the anodic and cathodic potentials). This IR efficiency advantage resulting from less distance between anodic and cathodic electrodes may be realized both in embodiments where metallic growth is occurring between the electrodes and in other embodiments, such as a metal hydride fuel where the hydrogen ions are being reduced.

To achieve progressive modification of which electrodes have the anodic potential, to account for shifts between electrodes having an anodic potential versus electrodes having a cathodic potential, the cell 10 in the charging mode would be configured such that the bypass switch 150 is open, so that current does not bypass the cell 10. Because the cell is in a charging mode, the oxidant electrode switch 160 is also open, so that the oxidant electrode 14 is electrically disconnected from the cell 10. Since initially fuel growth is desired on electrode body 12a, only electrode body 12a is electrically connected to first terminal 130, applying the cathodic potential thereto. To establish an anodic potential on the electrode body adjacent to electrode body 12a, at least electrode body 12b will be electrically connected to second terminal 140. To achieve this electrical connection in the illustrated embodiment, at least switch 180 is closed. In an embodiment, electrode bodies 12c-12d, and charging electrode 70 may also be electrically connected to second terminal 140, and thus may also have the anodic potential. Because of the potential difference between the electrode(s) having the anodic potential (i.e. initially electrode body 12a) and the electrode(s) having the cathodic potential (i.e. initially at least electrode body 12b), reducible fuel species in the ionically conductive medium may be reduced at the electrode having the initial cathodic potential (electrode body 12a) while cations in the ionically conductive medium are oxidized at electrode body 12b (and any other body/electrode to which the anodic potential is applied).

Once fuel growth on the electrodes having the cathodic potential progresses to a certain point, for example, to the point where an electrical connection is formed between the electrode(s) having the cathodic potential and the electrode(s) having the anodic potential, the switching system 60 may disconnect the shorting electrode body that had the anodic potential, such that that electrode body has a cathodic potential applied to it, and a potential difference may be formed again between adjacent electrode bodies. This may require the further electrical connection of the adjacent electrode body to the second terminal 140, if the electrical connection did not already exist, so as to create the anodic potential on that body. For example, in FIG. 9, once fuel growth on electrode body 12a causes a short with electrode body 12b, switch 180 is opened so that both electrode body 12a and, through the electric connection of the fuel growth, electrode body 12b, have the cathodic potential. On the other hand, switch 190 closes (if it was not already closed before), such that at least electrode body 12c has an anodic potential, thus maintaining the adjacent electrode body separation for the potential difference between the electrode(s) having the cathodic potential and the electrode(s) having the anodic potential.

The progressive shifting of which electrodes have the cathodic potential and which electrodes have the anodic potential may continue throughout the cell 10, with the opening of switches 190 and 200, until no further progression is desired or possible. For example, in the illustrated embodiment, wherein there is a separate charging electrode 70, the progression will end when the separate charging electrode 70 is the only electrode body having the anodic potential, and all permeable electrode bodies 12a-12d of the fuel electrode 12 have the cathodic potential. Charging of the cell 10 may subsequently end when fuel growth on electrode body 12d causes an electrical connection between electrode body 12d and charging electrode 70. In an embodiment, the switching system 70 may be configured to have an over-charge configuration, wherein the cell may be configured to selectively apply a cathodic potential to charging electrode 70 by opening switch 170, and closing switch 160, applying the anodic potential to the oxidant electrode 14, utilizing it for further charging of cell 10 by permitting fuel growth on the charging electrode 70.

During discharge of the cell 10 in the embodiment of FIG. 9, oxidant electrode switch 160 would be closed, while charging electrode switch 170 would be open. Additionally, switches 180, 190, and 200 would be open, and fuel consumption would be from electrode body 12d to electrode body 12a, wherein the electrical connection between the electrode bodies 12a-12d are through the fuel growth. In the illustrated embodiment, this is so electrode bodies 12a-12d are not shorted to the oxidant electrode 14 by oxidant electrode switch 160.

Figure 10:
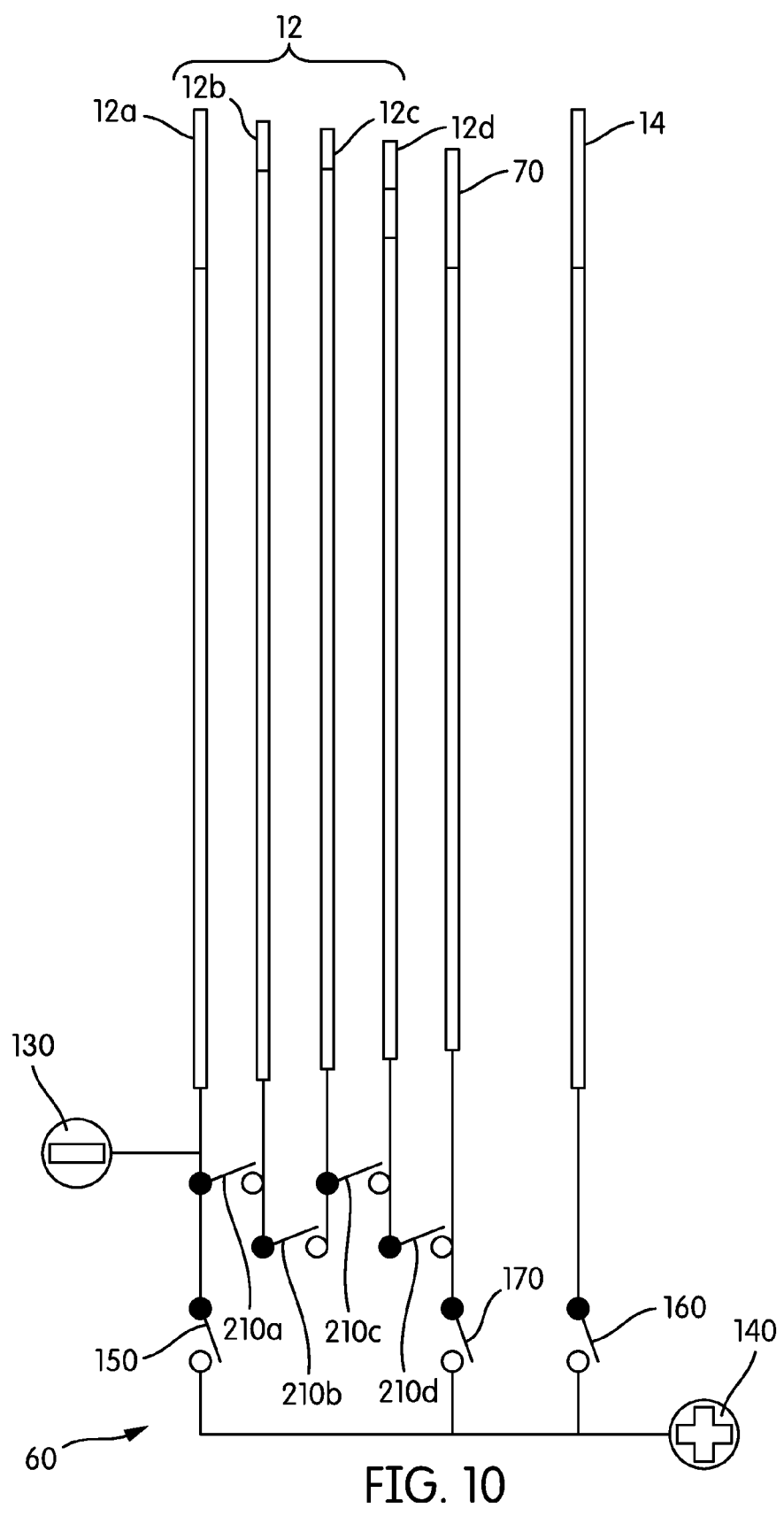
FIG. 10 schematically illustrates a switching system according to another embodiment of the cell system of FIG. 8.

Continuing to FIG. 10, another embodiment of switching system 60 is illustrated for the cell 10. Again there is the bypass switch 150, configured to connect first terminal 130 directly to second terminal 140, bypassing the cell 10. The switching system 60 also includes a series of connecting switches 210a-d, configured to selectively and progressively connect each of the electrode bodies 12b-d to either the first terminal 130 or the second terminal 140, such that each of the electrode bodies 12b-d either has a cathodic potential (i.e. is connected to at least electrode body 12a) or an anodic potential (i.e. is connected to at least charging electrode 70). As shown, during charging, bypass switch 150 would be open so the cell is not bypassed. Oxidant electrode switch 160 would also be open, so that oxidant electrode 14 is disconnected during the charging process. Charging electrode switch 170 would be closed so that at least charging electrode 70 would have an anodic potential. To promote minimal distance between the electrode(s) having the cathodic potential (initially just electrode body 12a) and the electrodes having the anodic potential, switches 210b, 201c, and 210d would be closed, so that the anodic potential created through the electrical connection to second terminal 140 is applied through electrode bodies 12b-12d, as well as charging electrode 70. As fuel growth on electrode body 12a progresses, it will eventually contact electrode body 12b. In an embodiment, at that time switch 210b would open, so that electrode bodies 12a-12b have the cathodic potential, while electrode bodies 12c-12d and charging electrode 70 have the anodic potential. In an embodiment, switch 210a would also be closed, so that a stronger electrical connection between electrode bodies 12a-12b is formed, beyond the electrical connection of the fuel growth. Such progression could continue, as above, with the opening of switches 210c and 210d respectively, as the number of electrode bodies having the anodic potential shrinks, while the number of electrodes having the cathodic potential grows. Again, in some embodiments switches 210b and 210c could close in progression, to form a stronger electrical connection between electrode bodies 12a-12d as the number of electrodes having a cathodic potential progressively grows.

During discharge of the cell 10 in the embodiment of FIG. 10, oxidant electrode switch 160 would be closed, while charging electrode switch 170 would be open. In an embodiment switches 210a-210d could remain open and fuel consumption would be from electrode body 12d to electrode body 12a, wherein the electrical connection between the electrode bodies 12a-12d are through the fuel growth. In another embodiment, switches 210a-210d could be closed, so that an electrical connection is between all electrode bodies 12a-12d of the fuel electrode 12, and fuel is oxidized throughout the fuel electrode 12 while an oxidant is reduced at the oxidant electrode 14. This is permissible in this embodiment because opening switch 170 also prevents the electrode bodies 12a-d from being shorted to the oxidant electrode 14 by oxidant electrode switch 160.

Figure 11:
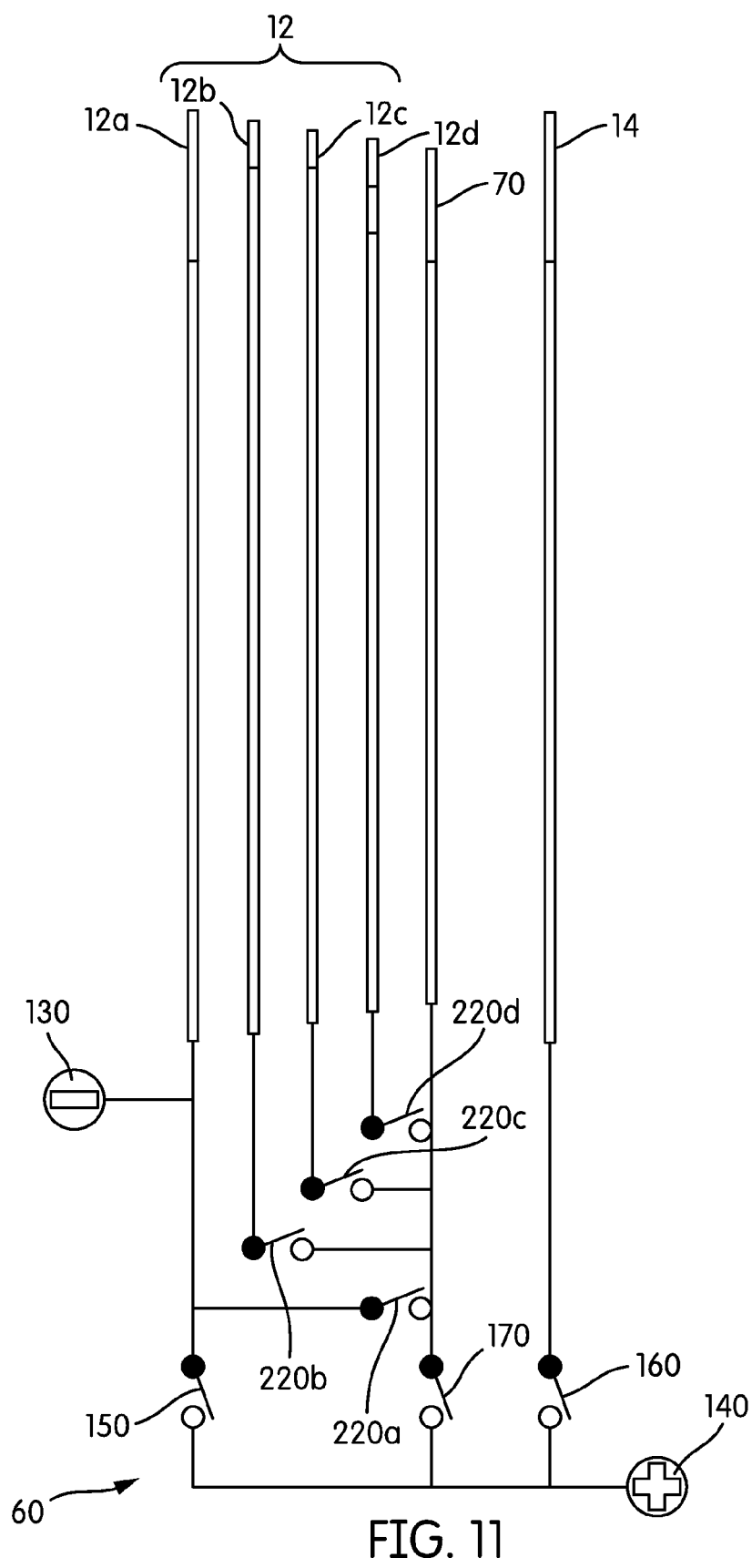
FIG. 11 schematically illustrates a switching system according to another embodiment of the cell system of FIG. 8.

Another embodiment of the switching system 60 for the cell 10 is seen in FIG. 11. Once more, the switching system 60 comprises the bypass switch 150, configured to selectively connect the first terminal 130 directly to the second terminal 140, in order to bypass the cell 10. The switching system 60 of the embodiment of FIG. 11 also includes another series of connecting switches 220a-d, configured to selectively connect each of the electrode bodies 12a-d to the charging electrode 70. Again, the switching system 60 may be configured to allow progressive change of those electrodes having the cathodic potential (i.e. at least electrode body 12a) and those electrodes having the anodic potential (i.e. at least charging electrode 70). As shown, during charging, bypass switch 150 would be open so the cell is not bypassed. Oxidant electrode switch 160 would also be open, so that oxidant electrode 14 is disconnected during the charging process. Charging electrode switch 170 would be closed so that at least charging electrode 70 would have an anodic potential. Switch 220a would be opened so that the cell is not bypassed from first terminal 130 to second terminal 140 through switch 220a and switch 170. To promote minimal distance between the electrode(s) having the cathodic potential (initially just electrode body 12a) and the electrodes having the anodic potential, at least switch 220b would be closed, so that at least electrode bodies 12b, as well as charging electrode 70, have the anodic potential. As fuel growth on electrode body 12a progresses, it will eventually contact electrode body 12b. In an embodiment, at that time switch 220b would open, so that electrode bodies 12a-12b have a cathodic potential (connected through the fuel growth). Switch 220c would then close, if it was not closed before, so that at least electrode body 12c, as well as charging electrode 70, would have the anodic potential. Such progression could continue, as above, with the opening of switches 210c and 210d respectively, as the number of electrode bodies having the anodic potential shrinks, while the number of electrode bodies having the cathodic potential grow.

During discharge of the cell 10 in the embodiment of FIG. 11, oxidant electrode switch 160 would be closed, while charging electrode switch 170 would be open. In an embodiment switches 220a-220d could remain open and fuel consumption would be from electrode body 12d to electrode body 12a, wherein the electrical connection between the electrode bodies 12a-12d are through the fuel growth therebetween.

The progressive shifting of which electrode bodies have a cathodic potential versus which electrode bodies have an anodic potential may be analogized as the cell 10 having N electrode bodies defining two conceptual electrodes, a cathodic potential electrode and an anodic potential electrode. In the cell, the constituent makeup of the cathodic potential electrode may begin with a single electrode body, while the anodic potential electrode may comprise at least the adjacent electrode body, up to all other electrode bodies. During charging, fuel grows on the cathodic potential electrode until, for example, no further growth on the electrode body is possible (i.e. the cathodic potential electrode has shorted to the anodic potential electrode). At that time, the electrode body of the anodic potential electrode that is adjacent to the cathodic potential electrode is reassigned to become part of the cathodic potential electrode, through an electrical connection formed by the fuel growth and/or through the use of electrical circuitry or switches associated with the electrode bodies of the cell. With the reassignment, the cathodic potential electrode now comprises two electrode bodies, while the anodic potential electrode has one less than its initial number of electrode bodies. As a potential difference may resume between the cathodic potential electrode and the anodic potential electrode, fuel growth from charging may resume, again until, for example, no further growth on the electrode bodies of the cathodic potential electrode is possible.

The progressive shifting of the constituent makeup of the cathodic potential electrode and the anodic potential electrode may continue throughout the cell, for example with the opening and/or closing of switches associated with the electrode bodies, until no further progression is desired or is possible. For example, once the anodic potential electrode comprises only a single electrode body, no further progression is possible. The charging of the cell may subsequently end when fuel growth on the cell causes an electrical connection to form between the conceptual cathodic potential electrode and the conceptual anodic potential electrode that comprises only a single electrode body.

Figure 12A:
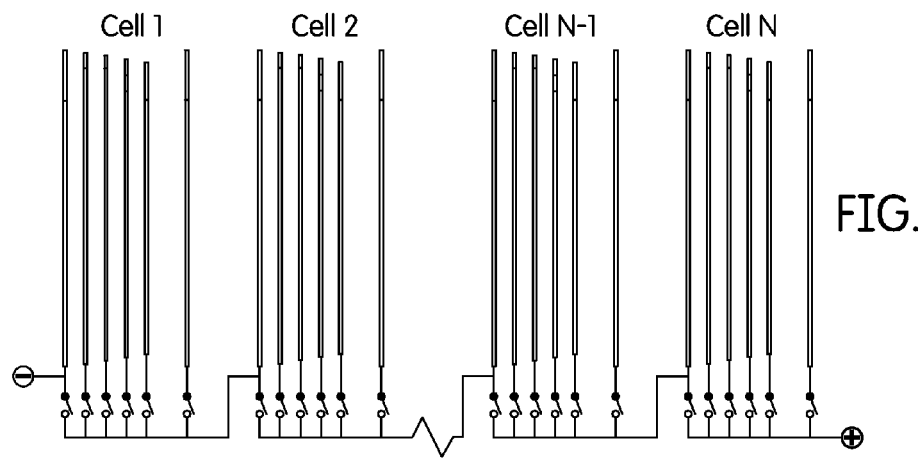
FIGS. 12A-C schematically illustrate the embodiments of FIGS. 9-11 further comprising a plurality of cells a switching system according to another embodiment of the cell of FIG. 8.
Figure 12B:
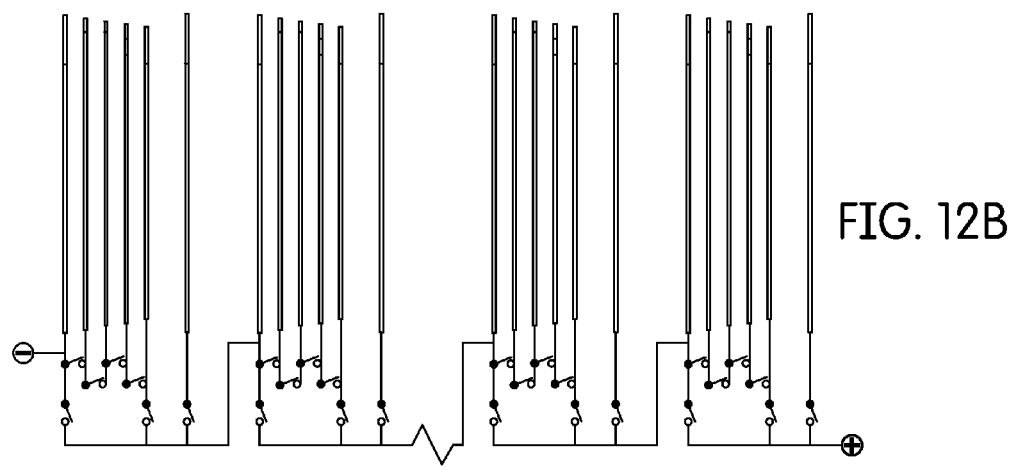
Figure 12C:
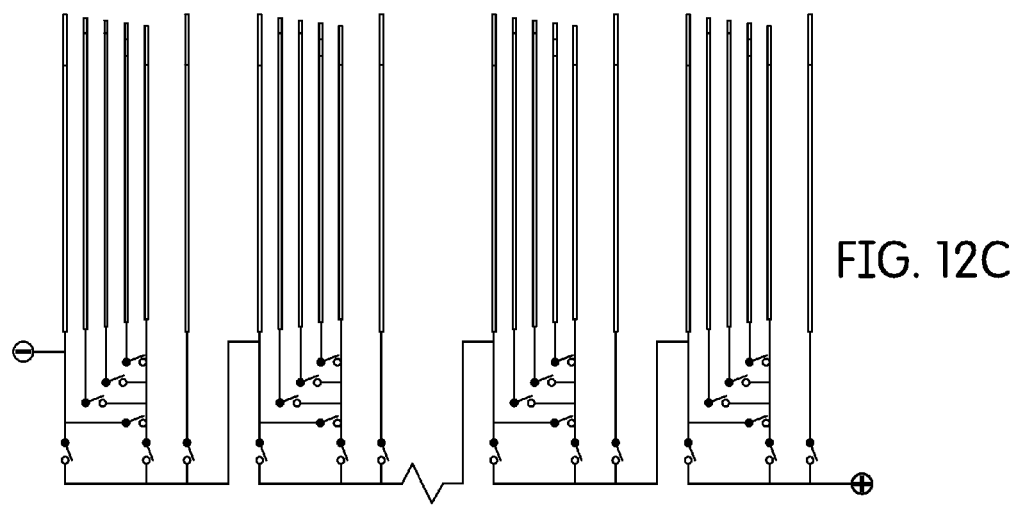

As noted previously, in an embodiment, multiple electrochemical cells 10 may be combined in cell system 100. Shown in FIGS. 12A-C are electrochemical cell systems 100 of the embodiments of FIGS. 9-11, however comprising N electrochemical cells 10. The number N is any integer greater than or equal to two, and is not limited to any particular number. As illustrated, the bypass switches 150 in the switching systems 60 of each cell 10 are configured to selectively bypass each cell 10 by providing a direct connection between the first terminal 130 and the second terminal 140. Such a connection may again be used to bypass defective cells 10, or for any other reason. Also, in various embodiments of cell systems 100, different embodiments of the switching system 60 (such as those found in FIGS. 9-11) may be used in conjunction with one another in a single cell system 100.

In any embodiment, the switches of the switching system 60 (or any other switch described herein) may be of any type, and the term switch is broadly intended to describe any device capable of switching between the modes or states described. For example, in some non-limiting embodiments, the switches may be single pole single throw or single pole double throw. They may be of the pivoting, sliding or latching relay type. Also, semiconductor based switches may be used as well. The switches may be activated electrically (electromechanical relay) or magnetically or by other methods known to those familiar in the art. Any other suitable type of switch may be used, and the examples herein are not limiting. In an embodiment, the plurality of switches may be connected in series if the switch has a leakage current in one direction. For example, the body diode of a MOSFET semiconductor based switch will conduct in one direction and the leakage current can be eliminated by placing MOSFET semiconductor based switches facing back to back in series.

Figure 13:
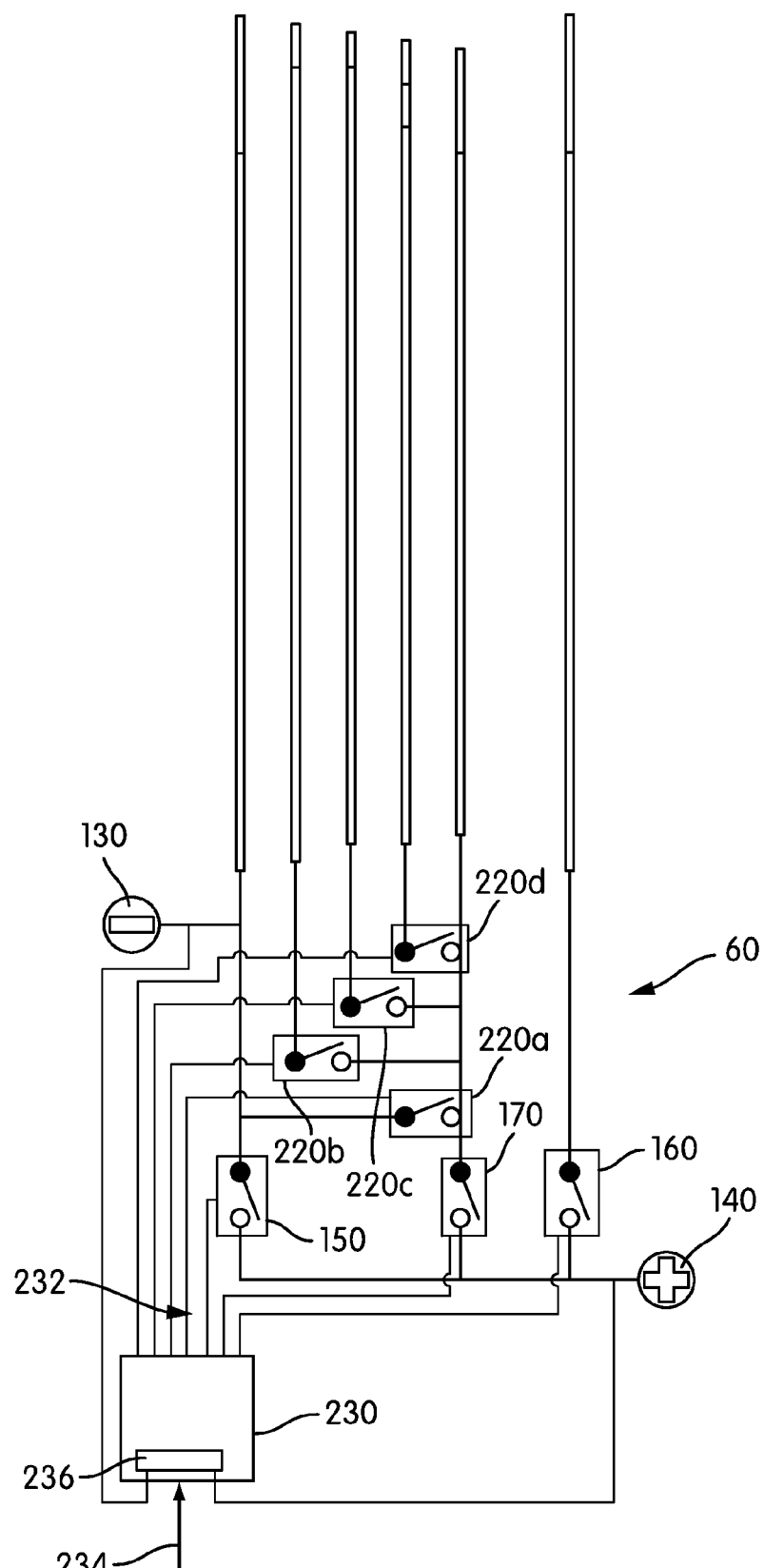
FIG. 13 schematically illustrates a switching system similar to the embodiment of FIG. 11, further comprising a controller.

Any suitable control mechanism may be provided to control the action of switches in the switching system 60 and/or the terminal selector system 62. As shown in FIG. 13, in an embodiment the switches of the switching system 60 may be controlled by a controller 230. The controller 230 may be of any construction and configuration. In an embodiment, the controller 230 may be configured to manage application of the anodic potential from the power supply PS to permeable electrode bodies 12b-d and the charging electrode 70. The controller 230 may cause electrodeposition of metal fuel, through reduction of reducible ions of the metal fuel from the ionically conductive medium, to progressively grow from permeable electrode body 12a to each subsequent electrode body 12b-d for application of a cathodic potential to each subsequently connected electrode body 12b-d. The controller 230 may also cause removal of the anodic potential from each subsequently connected electrode body, and may cause application of the anodic potential to at least the subsequent electrode body unconnected by the electrodeposition, or the charging electrode where the last electrode body (i.e. electrode body 12d) has been electrically connected by the electrodeposition to the prior electrode bodies 12a-c. Such application of the anodic potential may be configured to permit or cause oxidization of an oxidizable species of the oxidant.

In an embodiment, the controller 230 may comprise hardwired circuitry 232 that manipulates the switches based on an input 234 determining the proper switch configuration. The controller 230 may also include a microprocessor for executing more complex decisions, as an option. In some embodiments, the controller 230 may also function to manage connectivity between the load L and the power source and the first and Nth cells (i.e. may control the terminal selector system 62 described above). In some embodiments, the controller 230 may include appropriate logic or circuitry for actuating the appropriate bypass switches 150 in response to detecting a voltage reaching a predetermined threshold (such as drop below a predetermined threshold). In some embodiments, the controller 230 may further comprise or be associated with a sensing device 236, including but not limited to a voltmeter (digital or analog) or potentiometer or other voltage measuring device or devices, that can be used to determine when to modify the configuration of the plurality of switches, such as to maintain the proximity of the anode and the cathode as fuel growth progresses during charging. In some embodiments, the sensing device 236 may instead measure current, resistance, or any other electrical or physical property across or of the cell 10 that may be used to determine when to modify the configuration of the plurality of switches. For example, the sensing device 236 may measure a spike in current or a drop in potential difference between two electrode bodies. In some embodiments, the controller 230 may control the switches of the switching system 60 based on the passage of increments of time. For example, in an embodiment the time for fuel growth to progress between adjacent electrode bodies may be known, and used to calculate when to operate the switching system 60 so as to progressively rewire the electrodes to maintain an adjacent separation between the anode and the cathode. In an embodiment, the controller 230 may control the switches of switching system 60 to provide a high efficiency mode for the cell, such as is disclosed in U.S. patent application Ser. No. 13/083,929, incorporated in its entirety herein by reference.

In some embodiments, the controller 230 may be configured to selectively enter different charging modes. For example, in one mode a plurality of electrode bodies may initially have an anodic potential, but the number decreases as the electrode bodies are given a cathodic potential. In another mode, only a single electrode body has an anodic potential at any given time, and the electrode body with the anodic potential changes as prior electrode bodies are given the cathodic potential. For example, in the former mode, the controller 230 may close all switches associated with the charging electrode 70 and electrode bodies 12b-d during recharge, such that an anodic potential is applied to each of electrode bodies 12b-d and the charging electrode 70. The controller 230 may then progressively open the switches associated with each of electrode bodies 12b-d as the electrode bodies 12b-d progressively become electrically connected to electrode body 12a, and thus have a cathodic potential. In the latter mode, the controller may initially close only the switch associated with electrode body 12b, giving electrode body 12b an anodic potential while electrode body 12a has a cathodic potential. When fuel growth on electrode body 12a reaches electrode body 12b, creating an electrical connection therebetween, the controller 230 may open the switch associated with electrode body 12b that gave electrode body 12b the anodic potential, such that electrode body has a cathodic potential through its electrical connection to electrode body 12a. The controller 230 may then proceed to close the switch associated with electrode body 12c, to provide electrode body 12c with the anodic potential, again creating a potential difference, and the progression of fuel growth. These progressions of switch reassignments by the controller 230 may continue through or until only the charging electrode 70 has the anodic potential, as is described above.

Figure 14:
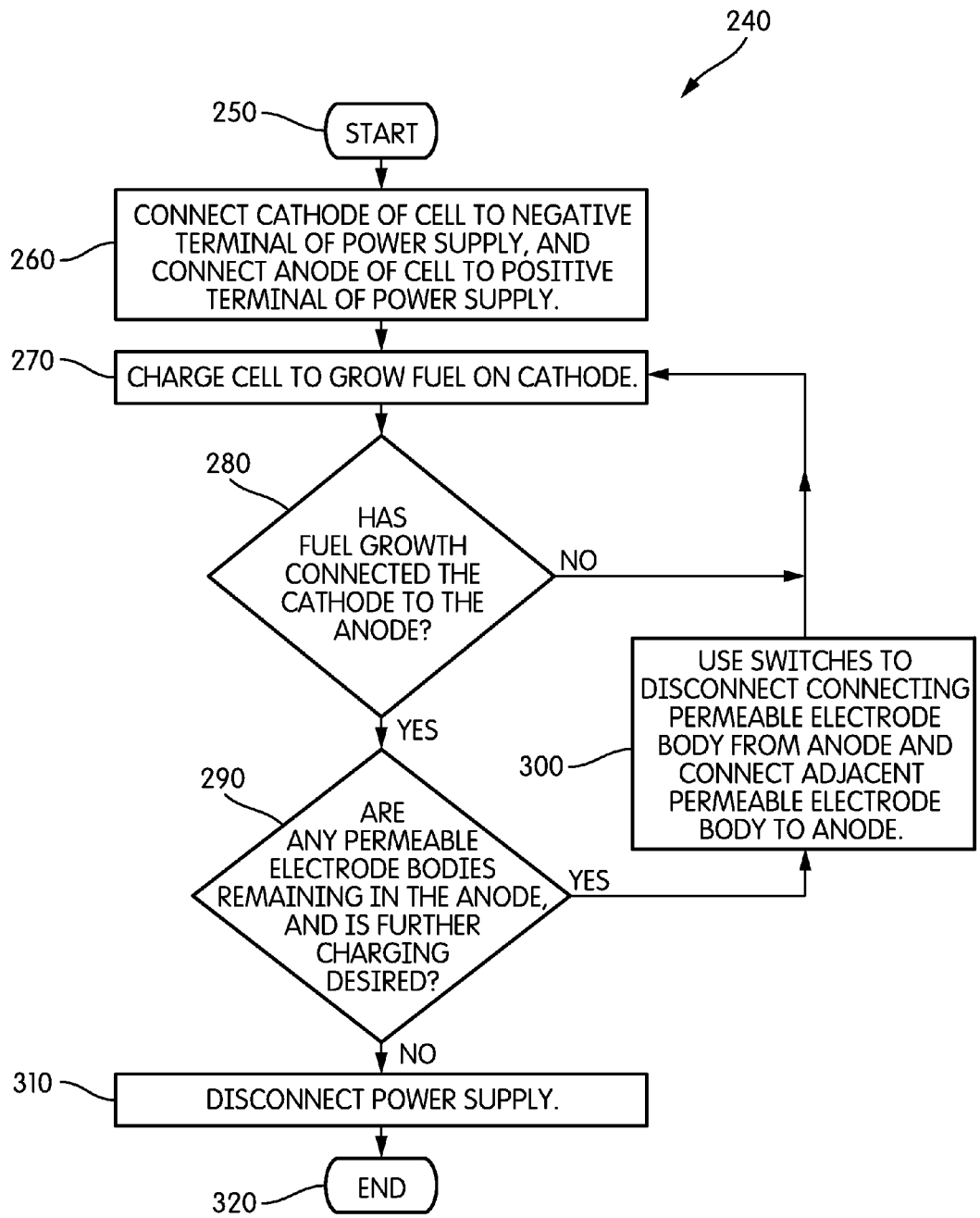
FIG. 14 shows a flowchart illustrating an embodiment of a method of charging the cell, in accordance with the present invention.

As seen in FIG. 14, another aspect of the present invention may include a method 240 for charging the electrochemical cell 10. Again, electrochemical cell 10 comprises the fuel electrode 12 comprising the plurality of permeable electrode bodies 12a-d. Although four permeable electrode bodies are listed, any number greater than or equal to two are possible. The cell 10 further includes the oxidant electrode 14, and the charging electrode, which may be the oxidant electrode 14 or the separate charging electrode 70. The cell 10 additionally includes the ionically conductive medium, and the switching system 60 comprising a plurality of switches, wherein at least some of the plurality of switches are associated with one of the permeable electrode bodies 12a-d, the oxidant electrode 14, and the charging electrode (i.e. oxidant electrode 14 or separate charging electrode 70). During a charging mode, reducible fuel ions in the ionically conductive medium are reduced and electrodeposited as fuel in oxidizable form on a cathode comprising at least permeable electrode body 12a while an oxidant is oxidized on an anode comprising at least an adjacent one of the permeable electrode bodies 12b-d and/or the charging electrode (i.e. charging electrode 70).

The method 240 starts at 250, and includes at 260 electrically connecting the cathode (i.e. in an embodiment, initially just permeable electrode body 12a), distal from the charging electrode, to the negative terminal of power supply PS, and the anode (i.e. initially at least permeable electrode body 12b) to the positive terminal of the power supply PS, creating a potential difference therebetween. The method 240 continues at 270, wherein, the fuel is electrodeposited on the cathode (i.e. at least permeable electrode body 12a). As seen in step 280, the method 240 may continue by determining if fuel growth has progressed to beyond a threshold amount. In an embodiment the threshold amount may be ascertained when the cell 10 is shorted by the fuel growth creating an electrical connection through the fuel growth between the cathode (i.e. permeable electrode body 12a) and the anode (i.e. permeable electrode body 12b). As shown, if fuel growth has not reached the threshold amount, the growth of fuel at 270 is repeated. Once the threshold amount is reached, the method continues at 290, wherein it may be determined if further fuel growth is both possible and desired. In an embodiment, the determination at 290 may include ascertaining if there are additional electrode bodies, such as permeable electrode bodies 12c-d, that fuel growth may be possible on. If so, the method continues at 300 by using the plurality of switches of the switching system 60 to disconnect the connecting electrode body (i.e. permeable electrode body 12b) from the anode, and if it were not connected through the switching system 60 before, connecting the next adjacent electrode body (i.e. permeable electrode body 12c) to the anode. This creates the potential difference between the cathode (now comprising permeable electrode bodies 12a-b) and the anode (comprising at least permeable electrode body 12c). The method 240 then returns to 270 wherein fuel growth continues on the cathode. If no further fuel growth is possible or desired at 290, the method 240 continues to 310 by disconnecting at least the negative terminal of the power source PS from the cell 10 to discontinue the charging process. The method 240 may then end at 320.

Figure 15:
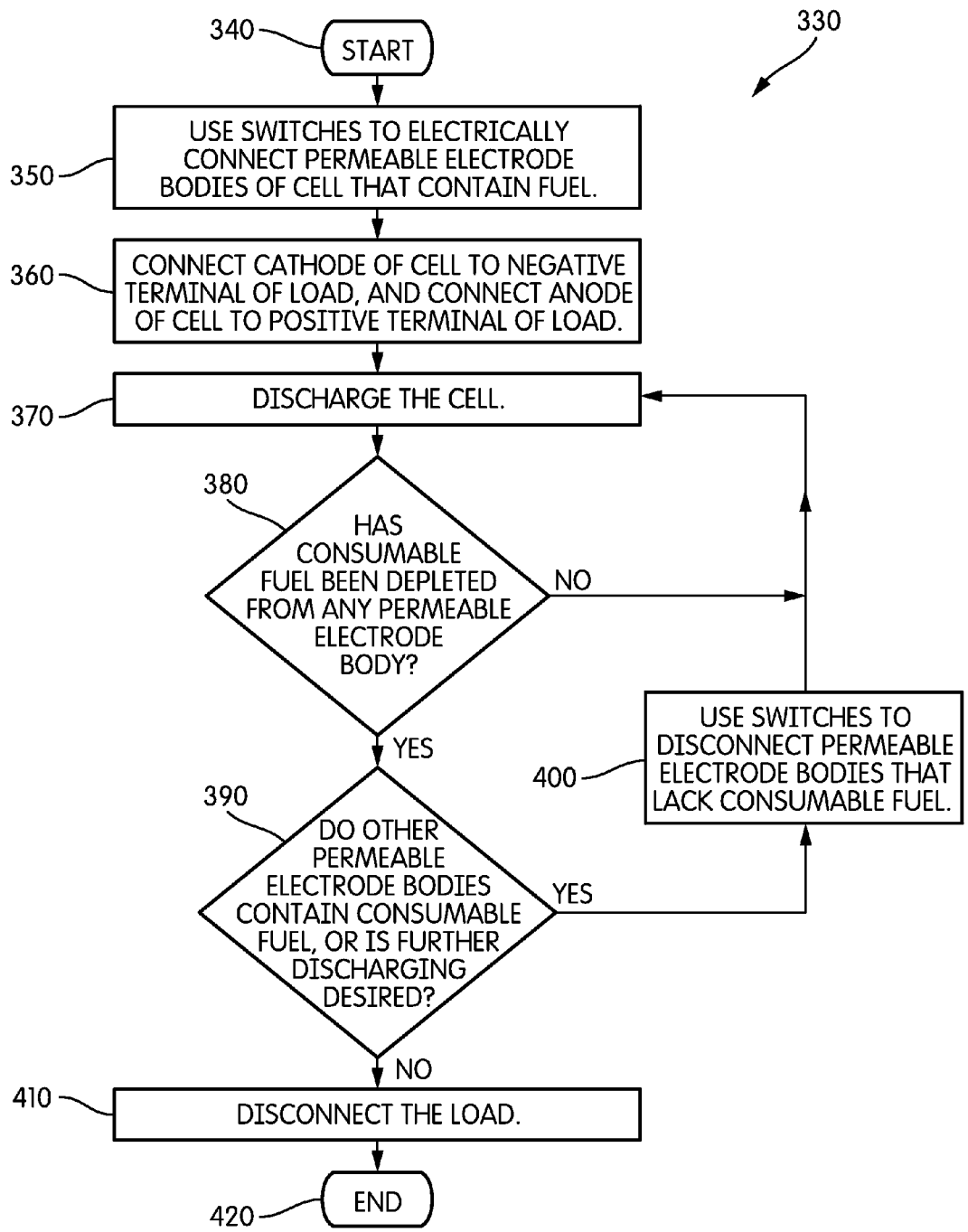
FIG. 15 shows a flowchart illustrating an embodiment of a method of discharging the cell.

Shown in FIG. 15, another aspect of the present invention may include a method 330 for discharging the electrochemical cell 10, which may be similar to that described above as related to FIG. 14. During the discharge mode, fuel on permeable electrode bodies 12a-12d is oxidized (and thus is consumed into the ionically conductive medium as reducible fuel ions), while an oxidizer is reduced at the oxidant electrode 14.

The method 330 starts at 340, and includes at 350 using the plurality of switches of the switching system 60 to connect the permeable electrode bodies 12a-d that contain fuel. In an embodiment, if the cell 10 is completely charged all permeable electrode bodies 12a-d would be electrically connected to one another. As the cell 10 is in discharge mode, the plurality of switches of the switching system 60 would be configured to electrically disconnect the separate charging electrode 70 (if present). In an embodiment, the method 330 would continue at 360 by electrically connecting the cathode (i.e. the air cathode, oxidant electrode 14) to the negative terminal of load L, and the anode (i.e. the fuel electrode 12, containing the electrically connected permeable electrode bodies 12a-d) to the positive terminal of the power supply PS, creating a potential difference therebetween. The method 330 continues at 370, wherein the fuel is consumed on the fuel electrode 12. In an embodiment, because the plurality of switches 60 connect the permeable electrode bodies 12a-d, an anodic potential is applied to each of the permeable electrode bodies 12a-d, and fuel may be consumed from each or any of permeable electrode bodies 12a-d. As seen in step 380, the method 330 may continue by determining if consumable fuel has been depleted from any permeable electrode body 12a-d. In some embodiments, depletion of the fuel may mean that the amount of fuel is below a useful level, including at zero. In an embodiment, this may be indicated by a drop-off in current from the particular electrode body 12a-d, or a drop in potential difference. In an embodiment, a sensor, such as the sensing device 236 above, which may include a current or a voltage sensor, may be present in the cell 10, and may indicate when consumable fuel has been depleted from one or more of the permeable electrode bodies 12a-d. If no depletion is detected, the discharging may continue as method 330 returns to step 370. If, however, consumable fuel has been depleted from one or more of permeable electrode bodies 12a-d, then method 330 may continue to step 390, wherein it may be determined whether there are any remaining permeable electrode bodies 12a-d that contain consumable fuel. This determination may be made simultaneously with the determination of depletion in step 380, and may be made through a survey of sensing device(s) 236, or by any other appropriate method.

If consumable fuel remains on one or more of permeable electrode bodies 12a-d, the method 330 may continue at step 400, wherein the switching system 60 adjusts the plurality of switches so that any of permeable electrode bodies 12a-d that lack consumable fuel are disconnected from fuel electrode 12. In an embodiment, consumption of fuel may initially be from the electrode body that is closest to the oxidant electrode 14 (such as, for example, permeable electrode body 12d in the illustrated embodiments above), and switching system 60 may disconnect permeable electrode body 12d, 12c, and 12b in that order, until all fuel is consumed from permeable electrode body 12a. Once none of the permeable electrode bodies 12a-d contain consumable fuel, or further discharging is no longer desired (or possible), the method may continue to step 410, wherein the load L may be disconnected. In an embodiment, the load L may remain connected to the cell 10 when it is depleted, until the cell 10 is recharged, in which case it may be disconnected so that the cell 10 may be connected instead to the power supply PS. The method 330 may then end at 420.

The foregoing illustrated embodiments have been provided solely to illustrate the structural and functional principles of the present invention, and should not be regarded as limiting. To the contrary, the present invention is intended to encompass all modification, substitutions, and alterations within the spirit and scope of the following claims.

The subject matter claimed in this application was made under a joint research agreement qualifying under 35 U.S.C. §103 (c)(2) and (3) to which Fluidic, Inc. and Arizona Science and Technology Enterprises, LLC acting as the exclusive master licensee for Arizona State University are parties.

What is claimed:

1. A rechargeable electrochemical cell system for generating electrical current using a metal fuel and an oxidant, the cell system comprising:
    an electrochemical cell comprising:
    (i) a fuel electrode comprising N permeable electrode bodies arranged in spaced apart relation in order 1 to N, wherein N is an integer greater than or equal to two, the fuel electrode comprising metal fuel on the permeable electrode bodies;
    (ii) an oxidant electrode spaced apart from the fuel electrode;
    (iii) a charging electrode selected from the group consisting of (a) the oxidant electrode, and (b) a separate charging electrode spaced from the fuel and oxidant electrodes; and
    (iv) an ionically conductive medium communicating the electrodes for conducting ions to support electrochemical reactions at the electrodes;
    wherein the fuel and oxidant electrodes are configured to, during a discharging mode, oxidize the metal fuel on the permeable electrode bodies and reduce the oxidant at the oxidant electrode, thus generating a potential difference for application to a load;
    a plurality of switches for selectively coupling each electrode body 2 to N of the fuel electrode and the charging electrode to a power source for application of an anodic potential during a re-charging mode in which a cathodic potential is applied to electrode body 1 by the power source;
    a controller configured to control the plurality of switches during the re-charging mode to manage application of the anodic potential from the power source to the permeable electrode bodies 2 to N and the charging electrode in a progressive manner so as to cause (a) electrodeposition of the metal fuel, via reduction of reducible ions of the metal fuel from the ionically conductive medium, to grow progressively from electrode body 1 towards the charging electrode with the electrodeposition progressively connecting each subsequent electrode body 2 to N to the electrode body 1 for application of the cathodic potential to each subsequently connected electrode body, (b) removal of the anodic potential from each subsequently connected electrode body, and (c) application of the anodic potential to at least the subsequent electrode body unconnected by the electrodeposition, or the charging electrode where electrode body N has been connected by the electrodeposition, for oxidation of an oxidizable species of the oxidant.

2. The electrochemical cell system according to claim 1, further comprising a plurality of the electrochemical cells assembled adjacent one another with a non-conductive barrier separating the oxidant electrode and fuel electrode of each pair of adjacent cells, such that the only permitted electrical connection therebetween is via at least one of said plurality of switches.

3. The electrochemical cell system according to claim 2, wherein said plurality of switches are switchable to a bypass mode for each cell by coupling the charging electrode, in the charge mode, or the oxidant electrode, in the discharge mode, of a previous cell to the fuel electrode of a subsequent cell.

4. The electrochemical cell system according to claim 2, wherein the cell is a metal-air cell with the fuel electrode comprising the metal fuel, the oxidant electrode comprising an air cathode for reducing oxygen, and the charging electrode being an oxygen evolving electrode for oxidizing an oxidizable oxygen species to oxygen.

5. The electrochemical cell system according to claim 4, wherein the metal fuel is selected from the group consisting of zinc, aluminum, iron, and manganese.

6. The electrochemical cell system according to claim 4, wherein each non-conductive barrier includes one or more ports for enabling oxygen to flow to the air cathode.

7. The electrochemical cell system according to claim 1, wherein the plurality of switches includes a switch switchable between coupling the cell to the load and coupling the cell to a power supply.

8. The electrochemical cell system according to claim 1, wherein each of said plurality of switches are associated with one of each of the plurality of permeable electrode bodies, the charging electrode, and the oxidant electrode.

9. The electrochemical cell system according to claim 1, wherein said plurality of switches are switchable to progressively connect permeable electrode body 1 through permeable electrode body N to the charging electrode.

10. The electrochemical cell system according to claim 1, wherein said plurality of switches are switchable to selectively connect each of permeable electrode bodies 1 through permeable electrode body N to the charging electrode.

11. The electrochemical cell system according to claim 1, wherein said plurality of switches are switchable to selectively connect each of permeable electrode bodies 1 through permeable electrode body N to the fuel electrode.

12. The electrochemical cell system according to claim 1, further comprising a controller configured to selectively open and close at least one of the plurality of switches.

13. The electrochemical cell system according to claim 12, wherein the controller is configured to be respondent to one or more sensors associated with the cell.

14. The electrochemical cell system according to claim 13, wherein the one or more sensors are configured to measure at least one of an increase in current above a threshold value or a decrease in potential difference above a threshold value between at least two of the permeable electrode bodies.

15. The electrochemical cell system according to claim 12, wherein the controller is further configured to selectively open and close at least one of the plurality of switches to apply the anodic potential to all of permeable electrode bodies 2-N that do not have the cathodic potential.

16. The electrochemical cell system according to claim 12, wherein the controller is further configured to selectively open and close at least one of the plurality of switches to apply the anodic potential to only one of permeable electrode bodies 2-N or the charging electrode, that is adjacent to at least one of permeable electrode bodies 1-N that have the cathodic potential.

17. A method for charging an electrochemical cell, wherein the electrochemical cell comprises:
(i) a fuel electrode comprising N permeable electrode bodies arranged in spaced apart relation in order 1 to N, wherein N is an integer greater than or equal to two, the fuel electrode comprising metal fuel on the permeable electrode bodies;
(ii) an oxidant electrode spaced apart from the fuel electrode;
(iii) a charging electrode selected from the group consisting of (a) the oxidant electrode, and (b) a separate charging electrode spaced from the fuel and oxidant electrodes; and
(iv) an ionically conductive medium communicating the electrodes for conducting ions to support electrochemical reactions at the electrodes;
wherein the fuel and oxidant electrodes are configured to, during a discharging mode, oxidize the metal fuel on the permeable electrode bodies and reduce the oxidant at the oxidant electrode, thus generating a potential difference for application to a load;
the method comprising:
applying a cathodic potential to electrode body 1 by coupling electrode body 1 to a power source;
managing application of an anodic potential to electrode bodies 2 to N by selectively coupling electrode bodies 2 to N to the power source for application of the anodic potential, so as to cause
(a) electrodeposition of the metal fuel, via reduction of reducible ions of the metal fuel from the ionically conductive medium, to grow progressively from electrode body 1 towards the charging electrode with the electrodeposition progressively connecting each subsequent electrode body 2 to N to the electrode body 1 for application of the cathodic potential to each subsequently connected electrode body,
(b) removal of the anodic potential from each subsequently connected electrode body, and
(c) application of the anodic potential to at least the subsequent electrode body unconnected by the electrodeposition, or the charging electrode where electrode body N has been connected by the electrodeposition, for oxidation of an oxidizable species of the oxidant; and
decoupling the power source to discontinue the charging.

18. The method of claim 17, wherein applying the cathodic potential comprises controlling an open/closed state of a plurality of switches associated with the cell.

19. The method of claim 17, wherein managing application of the anodic potential comprises controlling an open/closed state of a plurality of switches associated with the cell.

20. The method of claim 19, wherein controlling an open/closed state of the plurality of switches comprises connecting permeable electrode body 2 through permeable electrode body N to the charging electrode, and progressively disconnecting permeable electrode body 2 through N from the charging electrode as fuel growth electrically connects and applies a cathodic potential from permeable electrode body 1 through N.

21. The method of claim 17, wherein managing application of the anodic potential comprises controlling a plurality of switches by a controller, the controller responsive to at least one sensor associated with the cell.

22. The method of claim 21, wherein the at least one sensor is configured to measure an increase in current above a threshold value or a decrease in potential difference above a threshold value between at least two of the permeable electrode bodies.

23. The method of claim 21, wherein the at least one sensor is configured to measure a passage of an interval of time.

24. An electrochemical cell system for generating electrical current using a metal fuel and an oxidant, the cell system comprising:
an electrochemical cell comprising:
(i) a fuel electrode comprising N permeable electrode bodies arranged in spaced apart relation in order 1 to N, wherein N is an integer greater than or equal to two, the fuel electrode comprising metal fuel on the permeable electrode bodies;

(ii) an oxidant electrode spaced apart from the fuel electrode; and (iii) an ionically conductive medium communicating the electrodes for conducting ions to support electrochemical reactions at the electrodes;

wherein the fuel and oxidant electrodes are configured to, during a discharging mode, oxidize the metal fuel on the permeable electrode bodies and reduce the oxidant at the oxidant electrode, thus generating a potential difference for application to a load;

a plurality of switches for selectively coupling each electrode body 2 to N of the fuel electrode to the load;

one or more sensors associated with the electrode bodies 2 to N, configured to determine the presence of consumable fuel on each electrode body 2 to N; and a controller configured to control the plurality of switches during the discharging mode so as to disconnect from the load each of the electrode bodies 2 to N which the one or more sensors detect has the fuel depleted therefrom.

25. The electrochemical cell system according to claim 24, wherein the cell is a metal-air cell with the fuel electrode comprising the metal fuel, and the oxidant electrode comprising an air cathode for reducing oxygen.

26. The electrochemical cell system according to claim 24, wherein the metal fuel is selected from the group consisting of zinc, aluminum, iron, and manganese.

27. The electrochemical cell system according to claim 24, wherein the plurality of switches includes a switch switchable between coupling the cell to the load and coupling the cell to a power supply.

28. The electrochemical cell system according to claim 24, wherein each of said plurality of switches are associated with one of the plurality of permeable electrode bodies, and the oxidant electrode.

29. The electrochemical cell system according to claim 24, wherein the controller is configured to be respondent to the one or more sensors associated with the cell.

30. The electrochemical cell system according to claim 24, wherein the one or more sensors is configured to measure one or more of current, resistance, and voltage.

31. The electrochemical cell system according to claim 24, wherein the electrochemical cell system is rechargeable, and wherein the electrochemical cell further comprises:

(iv) a charging electrode selected from the group consisting of (a) the oxidant electrode, (b) a separate charging electrode spaced from the fuel and oxidant electrodes, and (c) a portion of the fuel electrode.

32. The electrochemical cell system according to claim 31, wherein the charging electrode is an oxygen evolving electrode for oxidizing an oxidizable oxygen species to oxygen.

33. The electrochemical cell system according to claim 31, wherein each of said plurality of switches are associated with one of the plurality of permeable electrode bodies, the charging electrode, and the oxidant electrode.

34. A method for discharging an electrochemical cell system, wherein the electrochemical cell system comprises:

an electrochemical cell comprising:

(i) a fuel electrode comprising a plurality of permeable electrode bodies arranged in spaced apart relation, the fuel electrode comprising metal fuel on the permeable electrode bodies;

(ii) an oxidant electrode spaced apart from the fuel electrode; and (iii) an ionically conductive medium communicating the electrodes for conducting ions to support electrochemical reactions at the electrodes;

wherein the fuel and oxidant electrodes are configured to, during a discharging mode, oxidize the metal fuel on the permeable electrode bodies and reduce the oxidant at the oxidant electrode, thus generating a potential difference for application to a load;

a plurality of switches for selectively coupling each electrode body of the fuel electrode to the load;

one or more sensors associated with the permeable electrode bodies, configured to determine the presence of consumable fuel on each of the permeable electrode bodies; and a controller configured to control the plurality of switches during the discharging mode so as to disconnect from the load each of the permeable electrode bodies which the one or more sensors detect has fuel depleted therefrom;

the method comprising:

discharging the electrochemical cell as connected to the load, so as to consume metal fuel from the permeable electrode bodies;

sensing, with the one or more sensors, depletion of the metal fuel from the one or more of the permeable electrode bodies;

disconnecting from the load, using the plurality of switches, each of the one or more of the permeable electrode bodies depleted of metal fuel; and continuing said discharging, sensing, and disconnecting until all metal fuel is depleted from the fuel electrode, or no further discharging is desired.

35. The method according to claim 34, wherein said sensing is controlled by the controller.

36. The method according to according to claim 34, wherein said sensing comprises measuring one or more of current, resistance, and voltage.

* * * * *